United States Patent
Kubota

(10) Patent No.: US 9,874,775 B2
(45) Date of Patent: Jan. 23, 2018

(54) LIQUID CRYSTAL DISPLAY DEVICE AND ELECTRONIC DEVICE

(71) Applicant: SEMICONDUCTOR ENERGY LABORATORY CO., LTD., Atsugi-shi, Kanagawa-ken (JP)

(72) Inventor: Daisuke Kubota, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 142 days.

(21) Appl. No.: 14/719,561

(22) Filed: May 22, 2015

(65) Prior Publication Data

US 2015/0346548 A1  Dec. 3, 2015

(30) Foreign Application Priority Data

May 28, 2014 (JP) ................................ 2014-109844

(51) Int. Cl.
  *G02F 1/1333* (2006.01)
  *G02F 1/1362* (2006.01)
  *G02F 1/1335* (2006.01)

(52) U.S. Cl.
  CPC .. *G02F 1/133371* (2013.01); *G02F 1/133345* (2013.01); *G02F 1/133553* (2013.01); *G02F 1/136213* (2013.01); *G02F 2203/02* (2013.01)

(58) Field of Classification Search
  CPC ......... G02F 1/133371; G02F 1/133553; G02F 2203/02; G02F 1/136213; G02F 1/133345; G02F 1/136286
  See application file for complete search history.

(56) References Cited

U.S. PATENT DOCUMENTS

| 5,731,856 A | 3/1998 | Kim et al. |
| 5,744,864 A | 4/1998 | Cillessen et al. |
| 6,294,274 B1 | 9/2001 | Kawazoe et al. |

(Continued)

FOREIGN PATENT DOCUMENTS

| EP | 1737044 A | 12/2006 |
| EP | 2226847 A | 9/2010 |

(Continued)

OTHER PUBLICATIONS

Fortunato.E et al., "Wide-Bandgap High-Mobility ZnO Thin-Film Transistors Produced at Room Temperature,", Appl. Phys. Lett. (Applied Physics Letters), Sep. 27, 2004, vol. 85, No. 13, pp. 2541-2543.

(Continued)

*Primary Examiner* — Jia Pan
(74) *Attorney, Agent, or Firm* — Nixon Peabody LLP; Jeffrey L. Costellia

(57) ABSTRACT

A reflective liquid crystal display device having improved contrast is provided. A reflective liquid crystal display device having improved color reproducibility is provided. A reflective liquid crystal display device having low power consumption is provided. A cell gap is adjusted for each color by devising the positions of a conductive layer and an insulating layer under a reflective electrode. A capacitor is placed under the reflective electrode, and one of the electrodes is a common electrode while the other thereof is a conductive layer or a metal oxide layer. By leaving or removing an insulating layer over the other electrode, the cell gap can be adjusted.

11 Claims, 21 Drawing Sheets

(56) References Cited

U.S. PATENT DOCUMENTS

| | | |
|---|---|---|
| 6,563,174 B2 | 5/2003 | Kawasaki et al. |
| 6,727,522 B1 | 4/2004 | Kawasaki et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al. |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,462,883 B2 | 12/2008 | Kumaki et al. |
| 7,468,304 B2 | 12/2008 | Kaji et al. |
| 7,501,293 B2 | 3/2009 | Ito et al. |
| 7,554,265 B2 | 6/2009 | Godo et al. |
| 7,674,650 B2 | 3/2010 | Akimoto et al. |
| 7,732,819 B2 | 6/2010 | Akimoto et al. |
| 7,851,989 B2 | 12/2010 | Noda |
| 8,269,227 B2 | 9/2012 | Yamazaki et al. |
| 8,633,473 B2 | 1/2014 | Noda et al. |
| 8,729,795 B2 | 5/2014 | Nomura et al. |
| 8,789,968 B2 | 7/2014 | Ohsawa et al. |
| 8,823,030 B2 | 9/2014 | Jinbo et al. |
| 8,957,442 B2 | 2/2015 | Seo et al. |
| 9,000,458 B2 | 4/2015 | Seo et al. |
| 9,006,755 B2 | 4/2015 | Sco et al. |
| 9,448,445 B2* | 9/2016 | Zhang ................ G02F 1/1343 |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0040756 A1* | 2/2005 | Winters ............. H01L 27/3213 313/504 |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0024556 A1* | 2/2007 | Yoshida ............ G02F 1/133371 345/88 |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252152 A1* | 11/2007 | Sato ................ G02F 1/136213 257/71 |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0233669 A1 | 9/2008 | Hirakata et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0059110 A1* | 3/2009 | Sasaki ............... G02F 1/134363 349/39 |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0128726 A1* | 5/2009 | Tanno ............... G02F 1/134363 349/43 |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2011/0073885 A1* | 3/2011 | Kim ................ H01L 27/3211 257/89 |
| 2012/0205701 A1 | 8/2012 | Sasaki et al. |
| 2012/0206675 A1* | 8/2012 | Seo ................ H01L 27/3211 349/96 |
| 2012/0218495 A1* | 8/2012 | Oshima ............... H01L 27/1225 349/61 |
| 2012/0223346 A1 | 9/2012 | Ohsawa et al. |
| 2012/0235126 A1 | 9/2012 | Yamazaki et al. |
| 2012/0256208 A1 | 10/2012 | Hatano |
| 2012/0273822 A1 | 11/2012 | Ohsawa et al. |
| 2013/0113843 A1 | 5/2013 | Yamazaki |
| 2013/0264549 A1 | 10/2013 | Yamazaki et al. |
| 2013/0265320 A1 | 10/2013 | Yamazaki et al. |
| 2013/0300968 A1* | 11/2013 | Okajima ........... G02F 1/136209 349/43 |
| 2014/0117339 A1 | 5/2014 | Seo |
| 2014/0225102 A1 | 8/2014 | Ikeda et al. |
| 2014/0284575 A1 | 9/2014 | Sugisawa et al. |
| 2014/0284576 A1 | 9/2014 | Sugisawa et al. |
| 2015/0041765 A1* | 2/2015 | Ahn ................ H01L 51/5268 257/40 |
| 2015/0076475 A1 | 3/2015 | Hirakata |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |

(56) References Cited

FOREIGN PATENT DOCUMENTS

| JP | 2000-150900 A | 5/2000 |
|---|---|---|
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2007-096055 | 4/2007 |
| JP | 2007-123861 | 5/2007 |
| WO | WO-2004/114391 | 12/2004 |

OTHER PUBLICATIONS

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters), Jun. 26, 2007, vol. 90, No. 26, pp. 262106-1-262106-3.

Takahashi.M et al., "Theoretical Analysis of IGZO Transparent Amorphous Oxide Semiconductor," IDW '08 : Proceedings of the 15th International Display Workshops, Dec. 3, 2008, pp. 1637-1640.

Hayashi.R et al., "42.1: Invited Paper: Improved Amorphous In—Ga—Zn—O TFTs,", SID Digest '08 : SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters) , Jun. 17, 1996, vol. 68, No. 25, pp. 3650-3652.

Nakamura.M et al., "The phase relations in the In2O3—Ga2ZnO4—ZnO system at 1350° C.,", Journal of Solid State Chemistry, Aug. 1, 1991, vol. 93, No. 2, pp. 298-315.

Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics) , Feb. 1, 2003, vol. 93, No. 3, pp. 1624-1630.

Asakuma.N et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.

Osada.T et al., "15.2: Development of Driver-Integrated Panel using Amorphous In—Ga—Zn-Oxide TFT,", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline InGaO3(ZnO)5 films,", Appl. Phys. Lett. (Applied Physics Letters) , Sep. 13, 2004, vol. 85, No. 11, pp. 1993-1995.

Li.C et al., "Modulated Structures of Homologous Compounds InMO3(ZnO)m (M=In,Ga; m=Integer) Described by Four-Dimensional Superspace Group,", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO (Ga2O3—In2O3—ZnO) TFT,", SID Digest '08 : SID International Symposium Digest of Technical Papers, May 20, 2008, vol. 39, pp. 633-636.

Lee.J et al., "World's Largest (15-Inch) XGA AMLCD Panel Using IGZO Oxide TFT,", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDs,", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing MoO3 as a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs ,", IDW '02 : Proceedings of the 9th International Display Workshops, Dec. 4, 2002, pp. 295-298.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Display,", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium-Gallium-Zinc Oxide TFTs Array,", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems,", Journal of Solid-State Circuits, 2008, vol. 43, No. 1, pp. 292-299.

Ohara.H et al., "Amorphous In—Ga—Zn-Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.

Coates.D et al., "Optical Studies of the Amorphous Liquid—Cholesteric Liquid Crystal Transition:The "Blue Phase",", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back Plane,", SID Digest '09 : SID International Symposium Digest of Technical Papers, May 31, 2009, pp. 280-283.

Lee.M et al., "15.4:Excellent Performance of Indium-Oxide-Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.

Sakata.J et al., "Development of 4.0-In. AMOLED Display With Driver Circuit Using Amorphous In—Ga—Zn-Oxide TFTs,", IDW '09 : Proceedings of the 16th International Display Workshops, 2009, pp. 689-692.

Park.J et al., "Amorphous Indium-Gallium-Zinc Oxide TFTs and Their Application for Large Size AMOLED,", AM-FPD '08 Digest of Technical Papers, Jul. 2, 2008, pp. 275-278.

Park.S et al., "Challenge to Future Displays: Transparent AM-OLED Driven by PEALD Grown ZnO TFT,", IMID '07 Digest, 2007, pp. 1249-1252.

Godo.H et al., "Temperature Dependence of Characteristics and Electronic Structure for Amorphous In—Ga—Zn-Oxide TFT,", AM-FPD '09 Digest of Technical Papers, Jul. 1, 2009, pp. 41-44.

Osada.T et al., "Development of Driver-Integrated Panel Using Amorphous In—Ga—Zn-Oxide TFT,", AM-FPD '09 Digest of Technical Papers, Jul. 1, 2009, pp. 33-36.

(56) References Cited

OTHER PUBLICATIONS

Hirao.T et al., "Novel Top-Gate Zinc Oxide Thin-Film Transistors (ZnO TFTs) for AMLCDs,", Journal of the SID, 2007, vol. 15, No. 1, pp. 17-22.
Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.
Godo.H et al., "P-9:Numerical Analysis on Temperature Dependence of Characteristics of Amorphous In—Ga—Zn-Oxide TFT,", SID Digest '09 : SID International Symposium Digest of Technical Papers, May 31, 2009, pp. 1110-1112.
Ohara.H et al., "21.3:4.0 In. QVGA AMOLED Display Using In—Ga—Zn-Oxide TFTs With a Novel Passivation Layer,", SID Digest '09 : SID International Symposium Digest of Technical Papers, May 31, 2009, pp. 284-287.
Miyasaka.M, "SUFTLA Flexible Microelectronics on Their Way to Business,", SID Digest '07 : SID International Symposium Digest of Technical Papers, 2007, vol. 38, pp. 1673-1676.
Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.
Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.
Asaoka.Y et al., "29.1:Polarizer-Free Reflective LCD Combined With Ultra Low-Power Driving Technology,", SID Digest '09 : SID International Symposium Digest of Technical Papers, May 31, 2009, pp. 395-398.
Lee.H et al., "Current Status of, Challenges to, and Perspective View of AM-OLED ,", IDW D6 : Proceedings of the 13th International Display Workshops, Dec. 7, 2006, pp. 663-666.
Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.
Nakamura.M, "Synthesis of Homologous Compound with New Long-Period Structure,", NIRIM Newsletter, Mar. 1, 1995, vol. 150, pp. 1-4.
Kikuchi.H et al., "Polymer-Stabilized Liquid Crystal Blue Phases,", Nature Materials, Sep. 2, 2002, vol. 1, pp. 64-68.
Kimizuka.N et al., "Spinel,YbFe2O4, and Yb2Fe3O7 Types of Structures for Compounds in the In2O3 and Sc2O3—A2O3—BO Systems [A; Fe, Ga, or Al; B: Mg, Mn, Fe, Ni, Cu,or Zn] at Temperatures over 1000° C.,", Journal of Solid State Chemistry, 1985, vol. 60, pp. 382-384.
Kitzerow.H et al., "Observation of Blue Phases in Chiral Networks,", Liquid Crystals, 1993, vol. 14, No. 3, pp. 911-916.
Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.
Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.
Orita.M et al., "Mechanism of Electrical Conductivity of Transparent InGaZnO4,", Phys. Rev. B (Physical Review. B), Jan. 15, 2000, vol. 61, No. 3, pp. 1811-1816.
Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.
Janotti.A et al., "Native Point Defects in ZnO,", Phys. Rev. B (Physical Review. B), Oct. 4, 2007, vol. 76, No. 16, pp. 165202-1-165202-22.
Park.J et al., "Electronic Transport Properties of Amorphous Indium-Gallium-Zinc Oxide Semiconductor Upon Exposure to Water,", Appl. Phys. Lett. (Applied Physics Letters) , 2008, vol. 92, pp. 072104-1-072104-3.
Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.
Janotti.A et al., "Oxygen Vacancies in ZnO,", Appl. Phys. Lett. (Applied Physics Letters) , 2005, vol. 87, pp. 122102-1-122102-3.
Oba.F et al., "Defect energetics in ZnO: A hybrid Hartree-Fock density functional study,", Phys. Rev. B. (Physical Review. B), 2008, vol. 77, pp. 245202-1-245202-6.
Orita.M et al., "Amorphous transparent conductive oxide InGaO3(ZnO)m (m<4):a Zn4s conductor,", Philosophical Magazine, 2001, vol. 81, No. 5, pp. 501-515.
Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.
Mo.Y et al., "Amorphous Oxide TFT Backplanes for Large Size AMOLED Displays,", IDW '08 : Proceedings of the 6th International Display Workshops, Dec. 3, 2008, pp. 581-584.
Kim.S et al., "High-Performance oxide thin film transistors passivated by various gas plasmas,", 214th ECS Meeting, 2008, No. 2317, ECS.
Clark.S et al., "First Principles Methods Using CASTEP,", Zeitschrift fur Kristallographie, 2005, vol. 220, pp. 567-570.
Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.
Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.
Oh.M et al., "Improving the Gate Stability of ZnO Thin-Film Transistors With Aluminum Oxide Dielectric Layers,", J. Electrochem. Soc. (Journal of The Electrochemical Society), 2008, vol. 155, No. pp. H1009-H1014.
Ueno.K et al., "Field-Effect Transistor on SrTiO3 With Sputtered Al2O3 Gate Insulator,", Appl. Phys. Lett. (Applied Physics Letters) , Sep. 1, 2003, vol. 83, No. 9, pp. 1755-1757.

* cited by examiner

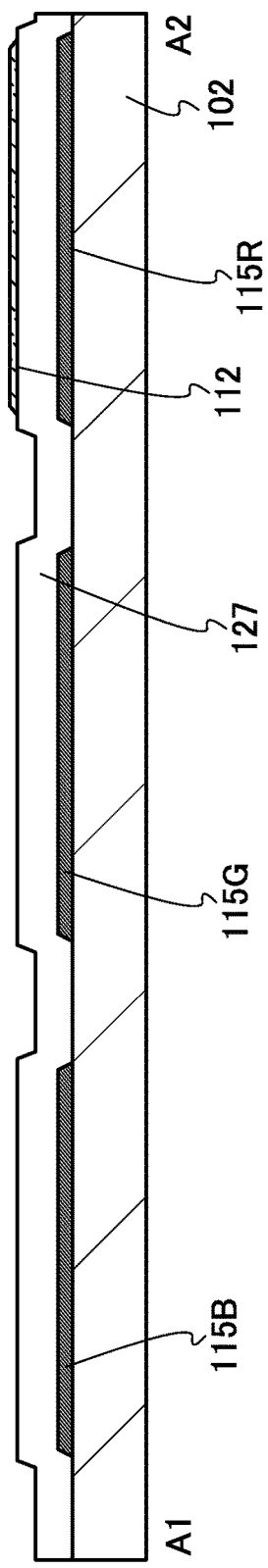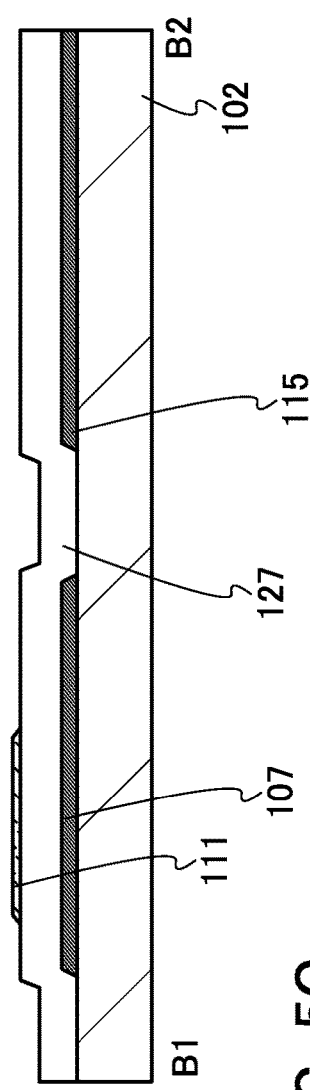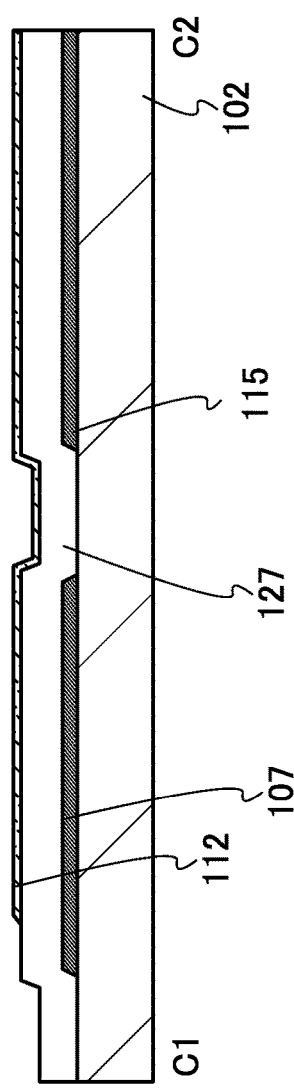
FIG. 5A
FIG. 5B
FIG. 5C

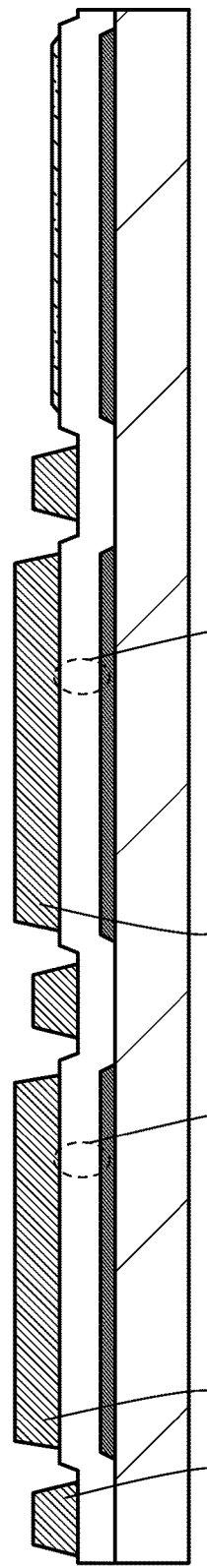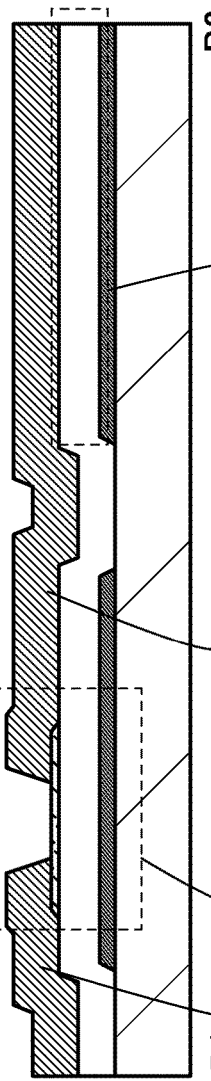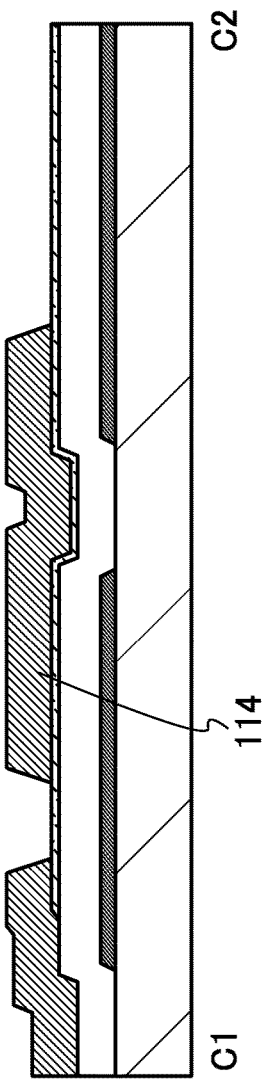

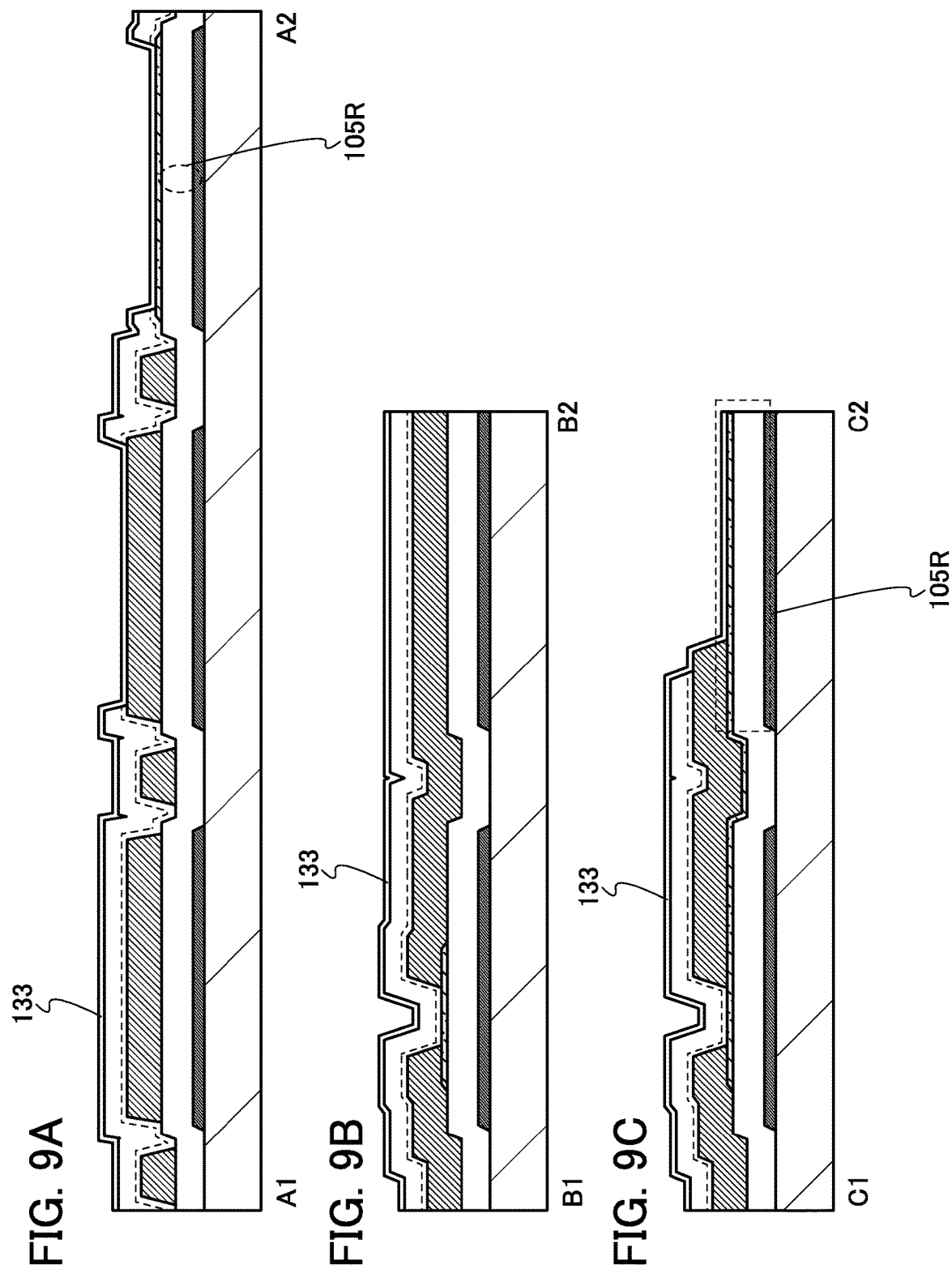

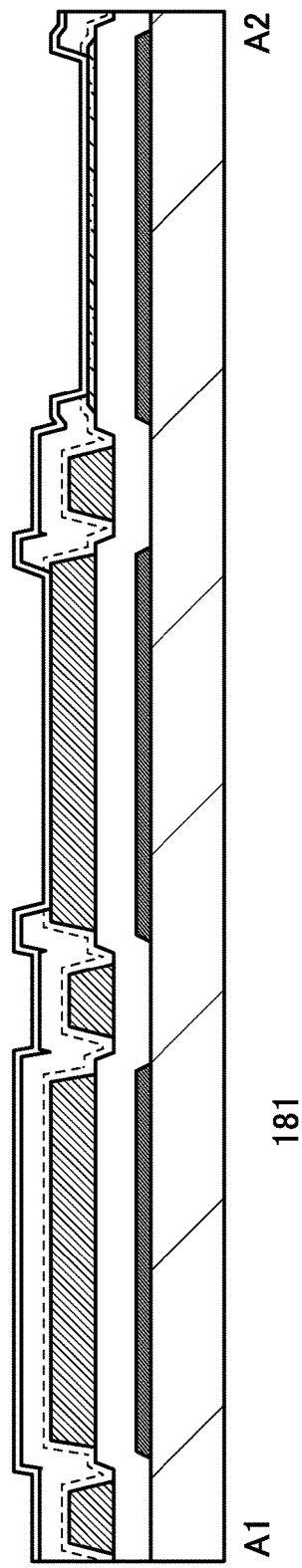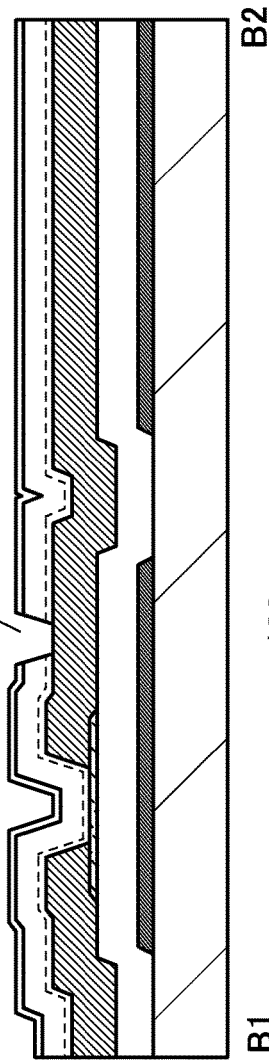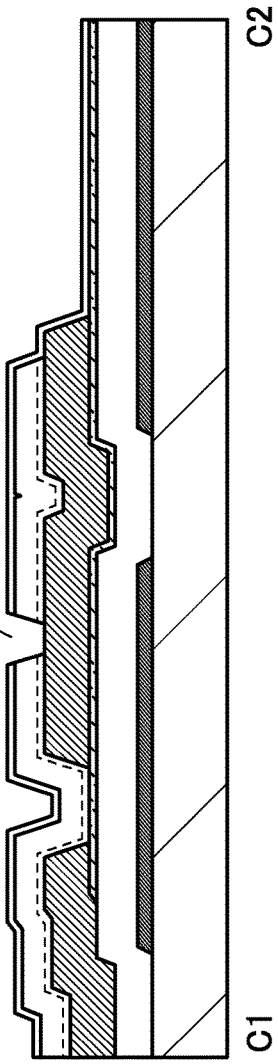

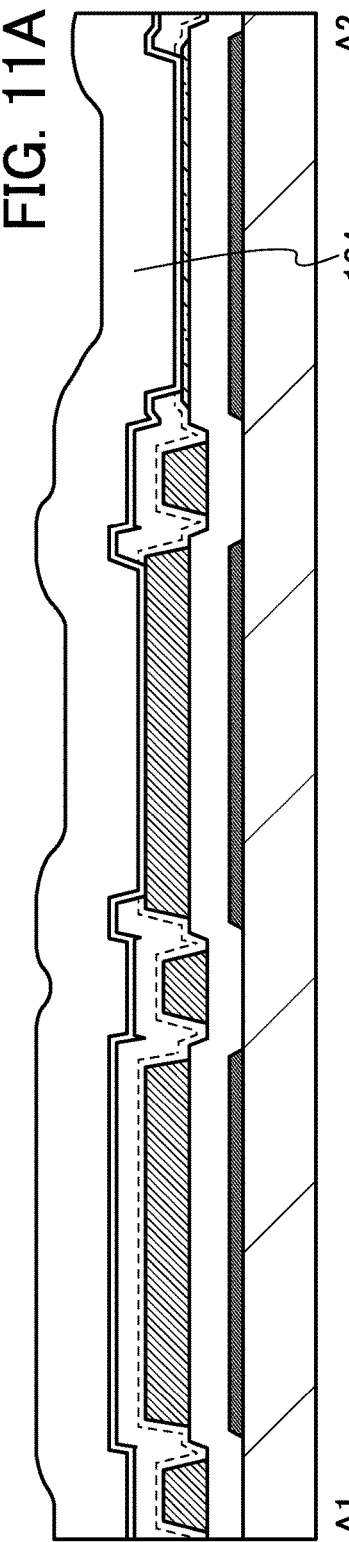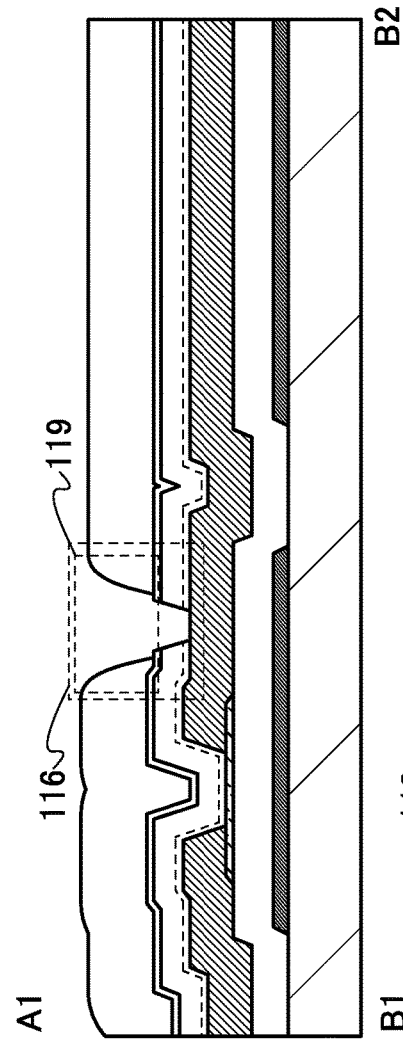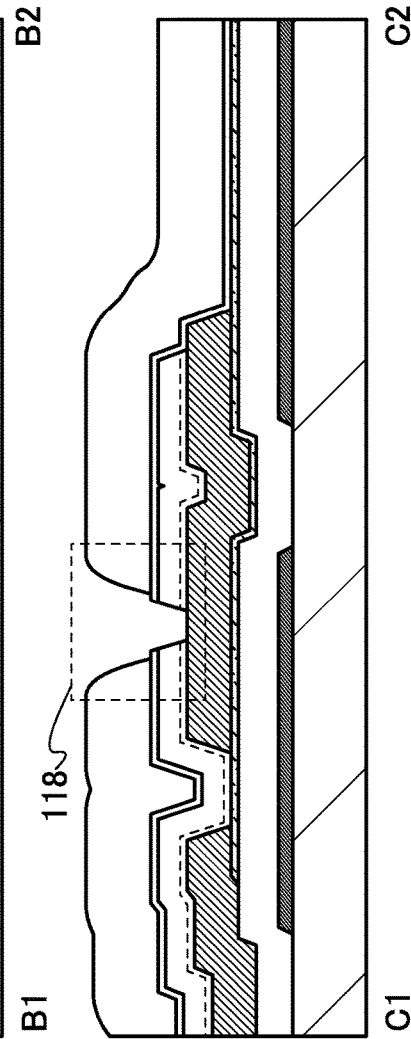

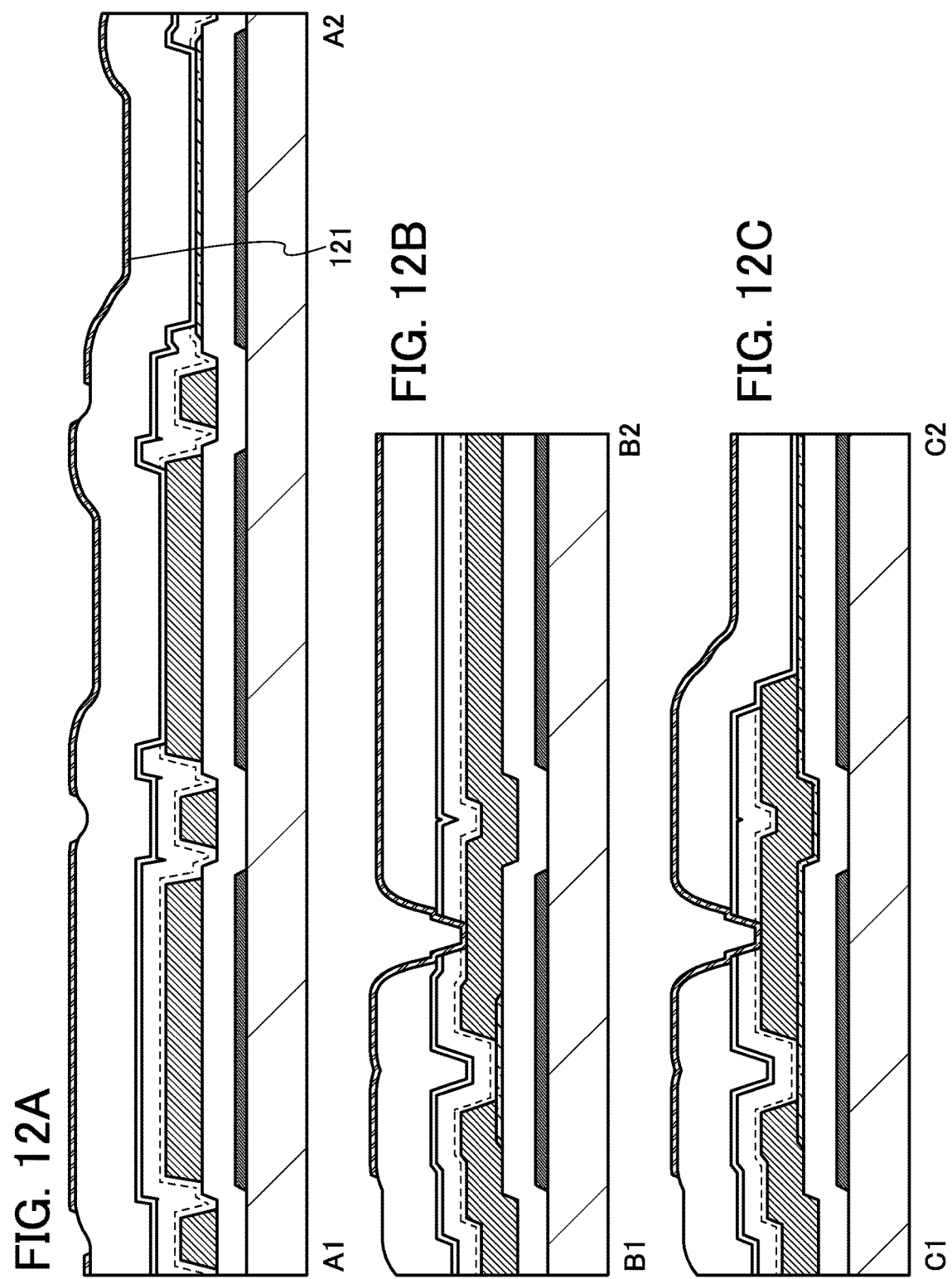

LIQUID CRYSTAL DISPLAY DEVICE AND ELECTRONIC DEVICE

BACKGROUND OF THE INVENTION

1. Field of the Invention

One embodiment of the present invention relates to a reflective liquid crystal display device and an electronic device including the liquid crystal display device.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a liquid crystal display device, a light-emitting device, a lighting device, a power storage device, a memory device, a method of driving any of them, and a method of manufacturing any of them.

2. Description of the Related Art

With the recent rapid spread of portable information terminals such as smartphones, improvement in their performance has progressed rapidly. Their screens have been increased in size and resolution, and emphasis has been on power consumption of display devices with increasing screen resolution. A typical example of display devices is a liquid crystal display device including a liquid crystal element. In each of pixels arranged in a matrix in a liquid crystal display device, a transistor serving as a switching element, a liquid crystal element electrically connected to the transistor, a capacitor connected to the liquid crystal element in parallel, and the like are provided.

As a semiconductor material of a semiconductor film of the transistor, a silicon semiconductor such as amorphous silicon or polysilicon (polycrystalline silicon) is generally used.

Metal oxides having semiconductor characteristics (hereinafter referred to as oxide semiconductors) can be used for semiconductor films in transistors. For example, techniques for manufacturing transistors using zinc oxide or an In—Ga—Zn-based oxide semiconductor are disclosed (see Patent Documents 1 and 2).

PATENT DOCUMENTS

[Patent Document 1] Japanese Published Patent Application No. 2007-123861

[Patent Document 2] Japanese Published Patent Application No. 2007-96055

SUMMARY OF THE INVENTION

Reducing power consumption of display devices for mobile applications, such as portable information terminals, is important. In transmissive liquid crystal display devices, backlights accounts for a large share of the power consumption. Therefore in a transmissive liquid crystal display device, long-time or repeated display rapidly consumes the battery and shortens the uptime of the portable information terminal. Reflective liquid crystal display devices not using backlights have low power consumption and are suitable for mobile applications. However, reflective liquid crystal display devices have disadvantages such as lower contrast and lower color reproducibility (NTSC ratio) than transmissive liquid crystal display devices. For this reason, reflective liquid crystal display devices are only used for some terminals that are not expected to perform high-quality color display.

In view of the above problem, one object of one embodiment of the present invention is to provide a reflective liquid crystal display device having improved contrast. Another object of one embodiment of the present invention is to provide a reflective liquid crystal display device having improved color reproducibility. Another object of one embodiment of the present invention is to provide a reflective liquid crystal display device having low power consumption. Another object of one embodiment of the present invention is to provide a novel display device. Note that the descriptions of these objects do not disturb the existence of other objects. One embodiment of the present invention does not necessarily achieve all the objects. Objects other than the above objects will be apparent from and can be derived from the descriptions of the specification, the drawings, the claims, and the like.

In a reflective liquid crystal display device, light from the outside enters a liquid crystal layer through a polarizing plate (also referred to as a polarizing film), is reflected by a reflective electrode and returned to the liquid crystal layer, and again enters the polarizing plate. At this time, the degree of optical modulation in the liquid crystal layer determines transmission or nontransmission through the polarizing plate to control brightness and darkness. Here, the state in which the luminance is the highest is referred to as bright state, the state in which the luminance is the lowest is referred to as dark state, and the state between the bright state and the dark state is referred to as half-tone state. As the ratio of the luminance of the bright state to the luminance of the dark state is higher, a display device with a higher contrast and higher color reproducibility can be obtained.

In the case of a reflective liquid crystal display device, in the bright state, light is optically modulated in the liquid crystal layer and therefore, ideally, the luminance is maximized when the following equation is satisfied: $\Delta n \times d = \lambda/4$ (Equation 1), where $\Delta n$ is the optical constant of liquid crystal, d is the thickness (also referred to as cell gap) of the liquid crystal layer, and $\lambda$ is the wavelength of light. Note that the optical constant $\Delta n$ of liquid crystal is preferably greater than or equal to 0.08 and less than or equal to 0.1.

Note that when there is a region with high wavelength dependence of $\Delta n$ or high controllability of alignment (anchoring force) for the liquid crystal by an alignment film, a correction is made as appropriate. An ideal state which is not affected by these is described using the following calculation.

Even when a TN mode is employed for the liquid crystal layer, Equation 1 given above is satisfied in the case of a reflective liquid crystal display device. The TN mode is generally regarded as an optical rotation mode but can be regarded as a birefringence mode in a normal reflective liquid crystal display device. Conditions for the optical rotation mode need to meet the Mauguin condition: $\Delta n \times p \gg \lambda$. Here, p is a pitch of twist in one cycle. In the TN mode, p=4d because liquid crystal is twisted by 90° in a cell gap d. Therefore the Mauguin condition is as follows: $4\Delta n \times d \gg \lambda$. On the assumption that $\lambda$=500 nm, $4\Delta n \times d \gg 500$ nm. Thus, in the case of the cell gap of a normal reflective liquid crystal display device, the Mauguin condition is not satisfied in the TN mode and hence the TN mode may be regarded as a birefringence mode. Consequently, Equation 1 is satisfied.

In a color reflective liquid crystal display device, since the same cell gap d is generally employed for red (R), green (G), and blue B, optimization for any color reduces the luminance of the other colors in the bright state. Accordingly, a color reflective liquid crystal display device has reduced contrast or color reproducibility.

Furthermore, a thicker color filter for higher color reproducibility (NTSC ratio) fails to ensure brightness and results in dark display as a whole.

In view of the above, according to one embodiment of the present invention, a cell gap is adjusted for each color by modifying arrangement of a conductive layer and an insulating layer under a reflective electrode. In other words, the thickness corresponding to the distance between a substrate and the reflective electrode is adjusted for each color by leaving or removing the conductive layer and the insulating layer.

The cell gaps for the respective colors are as follows: $d_B=\lambda_B/(4\times\Delta n)$, $d_G=\lambda_G/(4\times\Delta n)$, and $d_R=\lambda_R/(4\times\Delta n)$, where $\lambda_B$ is a B wavelength, $\lambda_G$ is a G wavelength, and $\lambda_R$ is an R wavelength. For example, arrangement of the conductive layer and the insulating layer under the reflective electrode is modified so that the ratio between the cell gaps is approximately as follows: $d_B:d_G:d_R=\lambda_B:\lambda_G:\lambda_R=1.0:1.2:1.4$, where $\lambda_B=450$ nm, $\lambda_G=540$ nm, and $\lambda_R=630$ nm.

Specifically, in the case where the optical constant $\Delta n$ of liquid crystal is 0.08, the optimum cell gaps for the respective colors at the above wavelengths are follows: $d_B=1406$ nm, $d_G=1688$ nm, and $d_R=1969$ nm. When a spacer is used so that the cell gap for B is the gap between the reflective electrode and the outermost surface of the films formed on the counter substrate, the thicknesses each corresponding to the distance between the substrate and the reflective electrode for G and for R are set shorter by 282 nm and 563 nm, respectively, than that for B.

The RGB wavelengths can be set to the peak wavelengths of the transmittances of the respective color filters. In many cases, for example, the R transmittance becomes substantially constant on the long-wavelength side of a certain wavelength or more; in such a case, the R wavelength is set within the wavelength range where the transmittance is constant. Furthermore, since the transmittance of a color filter has a relatively broad spectrum peaking at a certain wavelength, the RGB wavelengths may each be set within the wavelength range of normalized transmittances of 0.95 or more assuming that the peak of the transmittance is 1. In other words, as long as the above conditions are satisfied, the cell gaps for RGB may have a margin.

A structure of a pixel portion and a method of adjusting the thickness corresponding to the distance between the substrate and the reflective electrode for each color are described below. A capacitor is placed in a layer under the reflective electrode. Furthermore, a transistor may be included in a layer under the reflective electrode. The capacitor functions as a storage capacitor storing data written to a pixel. In a storage capacitor portion, the thickness corresponding to the distance between the substrate and the reflective electrode is adjusted for each color. Part of the storage capacitor portion and a region other than the storage capacitor portion include regions whose thicknesses are difficult to adjust. The reflective electrode is preferably placed in such regions to increase the aperture ratio.

The transistor is a bottom-gate transistor, in which an oxide semiconductor is used as a semiconductor layer. A conductive film in the same layer as a gate electrode of the bottom-gate transistor and an insulating layer in the same layer as a gate insulating layer are respectively used as one of electrodes and a dielectric in the capacitor. These are common to all the colors.

A layer structure for each color is adjusted as follows. First, what is used as the other of the electrodes of the capacitor can be selected from a conductive layer in the same layer as a source electrode and a drain electrode of the transistor, an oxide semiconductor in the same layer as the semiconductor layer of the transistor as a conductive layer (hereinafter referred to as OC electrode), and a stack of the conductive layer in the same layer as the source electrode and drain electrode of the transistor and the OC electrode is used. A thickness difference between the conductive layer in the same layer as the source electrode and drain electrode of the transistor and the OC electrode or the thickness of the conductive layer in the same layer as the source electrode and drain electrode of the transistor is used to adjust the cell gap. Next, whether a first interlayer insulating layer over the other of the electrodes of the capacitor is left or removed can be selected. The thickness of the first interlayer insulating layer is used to adjust the cell gap. Here, the use of the OC electrode as the electrode of the capacitor as a single layer requires a second interlayer insulating layer in contact with the OC electrode. As the first interlayer insulating layer, a silicon oxide-based insulating layer is used, and as the second interlayer insulating layer, a silicon nitride-based insulating layer is used.

As described above, there are six types depending on the presence or absence of the OC electrode, the presence or absence of the conductive layer in the same layer as the source electrode and drain electrode of the transistor, and the presence or absence of the first interlayer insulating layer. However, in a region where the OC electrode is not in contact with the conductive layer in the same layer as the source electrode and drain electrode of the transistor and the first insulating layer is formed on and in contact with the OC electrode, the OC electrode is not conductive and cannot be used as the electrode of the capacitor. Although the reflective electrode might instead be used as the other of the electrodes of the capacitor, such use changes the thickness of the dielectric to significantly change the capacitance value and is preferably avoided. Thus, according to one embodiment of the present invention, five types of cell gap structures, in each of which the capacitance values of the capacitors are substantially the same, can be achieved.

To perform color display with the three colors RGB, three types are selected from the above five types. Also with the four colors, four types are selected from the above five types. Furthermore, a pixel of each color may be divided into subpixels and the subpixels of the same color may have different cell gaps.

To perform color display with four colors, one color selected from colors such as cyan, magenta, and yellow may be added to RGB. Alternatively, a color having a wavelength between those of R and G, a color having a wavelength between those of G and B, a color having a longer wavelength than R, a color having a shorter wavelength than B, or the like may be added. Thus, the color reproduction range (NTSC ratio) can be expanded. Alternatively, white (W) is added to form an RGBW structure. In the case of employing white (W), the cell gap for W may be the same length as that for G. Since the G wavelength is close to the peak wavelength (approximately 555 nm) of the human relative luminosity, white light having a wavelength in a region with a high relative luminosity in the wavelength range of white light can be efficiently used. Alternatively, the cell gap for W may have a length calculated from the peak wavelength of the relative luminosity. Thus, the efficiency of white light emission increases so that the reflective liquid crystal display device can provide bright display.

To perform color display with five colors, as in the case of four colors, two colors having wavelengths different from those of RGB may be added to RGB. Thus, the color reproduction range (NTSC ratio) can be expanded.

To perform color display with four or five colors, three different cell gaps, one of which is common to two or three colors, may be employed. Alternatively, the cell gaps for all the colors may be different from each other so as to correspond to the respective wavelengths.

One embodiment of the invention disclosed in this specification is a reflective liquid crystal display device comprising a first pixel comprising a first cell gap, a second pixel comprising a second cell gap, and a third pixel comprising a third cell gap. The first pixel comprises a first conductive layer over a first substrate, a first insulating layer over the first conductive layer, a second conductive layer over the first insulating layer, a second insulating layer over the second conductive layer, a third insulating layer over the second insulating layer, and a first reflective electrode over the third insulating layer. The second pixel comprises a third conductive layer over the first substrate, the first insulating layer over the third conductive layer, a fourth conductive layer over the first insulating layer, the second insulating layer over the fourth conductive layer, the third insulating layer over the second insulating layer, a second reflective electrode over the third insulating layer, and a first opening in the second insulating layer over the fourth conductive layer. The third pixel comprises a fifth conductive layer over the first substrate, the first insulating layer over the fifth conductive layer, a metal oxide layer over the first insulating layer, the second insulating layer over the metal oxide layer, the third insulating layer over the second insulating layer, a third reflective electrode over the third insulating layer, and a second opening in the second insulating layer over the metal oxide layer. The metal oxide layer is in contact with the third insulating layer.

According to a manufacturing method of one embodiment of the present invention, three to five different cell gaps can be obtained only by adding one mask for patterning the first interlayer insulating layer; thus, the cell gap can be adjusted for each of RGB. Furthermore, when three different cell gaps are formed, the use of a half-tone mask or a gray-tone mask enables the source electrode, drain electrode, and semiconductor layer of the transistor to be processed with one mask. Accordingly, the number of masks can be reduced, as compared with the case where the source electrode, drain electrode, and semiconductor layer of the transistor are processed with different masks.

According to one embodiment of the present invention, a reflective liquid crystal display device having improved contrast can be provided. A reflective liquid crystal display device which has improved color reproducibility (NTSC ratio) without impairing brightness can be provided. A reflective liquid crystal display device having low power consumption can be provided. A novel display device can be provided.

The descriptions of these effects do not disturb the existence of other effects. Note that one embodiment of the present invention does not necessarily achieve all the objects. Objects other than the above objects will be apparent from and can be derived from the descriptions of the specification, the drawings, the claims, and the like.

BRIEF DESCRIPTION OF THE DRAWINGS

In the accompanying drawings:

FIGS. 5A to 5C are cross-sectional views illustrating a method of manufacturing a display device of one embodiment of the present invention;

FIGS. 6A to 6C are cross-sectional views illustrating a method of manufacturing a display device of one embodiment of the present invention;

FIGS. 9A to 9C are cross-sectional views illustrating a method of manufacturing a display device of one embodiment of the present invention;

FIGS. 10A to 10C are cross-sectional views illustrating a method of manufacturing a display device of one embodiment of the present invention;

FIGS. 11A to 11C are cross-sectional views illustrating a method of manufacturing a display device of one embodiment of the present invention;

FIGS. 12A to 12C are cross-sectional views illustrating a method of manufacturing a display device of one embodiment of the present invention;

DETAILED DESCRIPTION OF THE INVENTION

Figure 1:
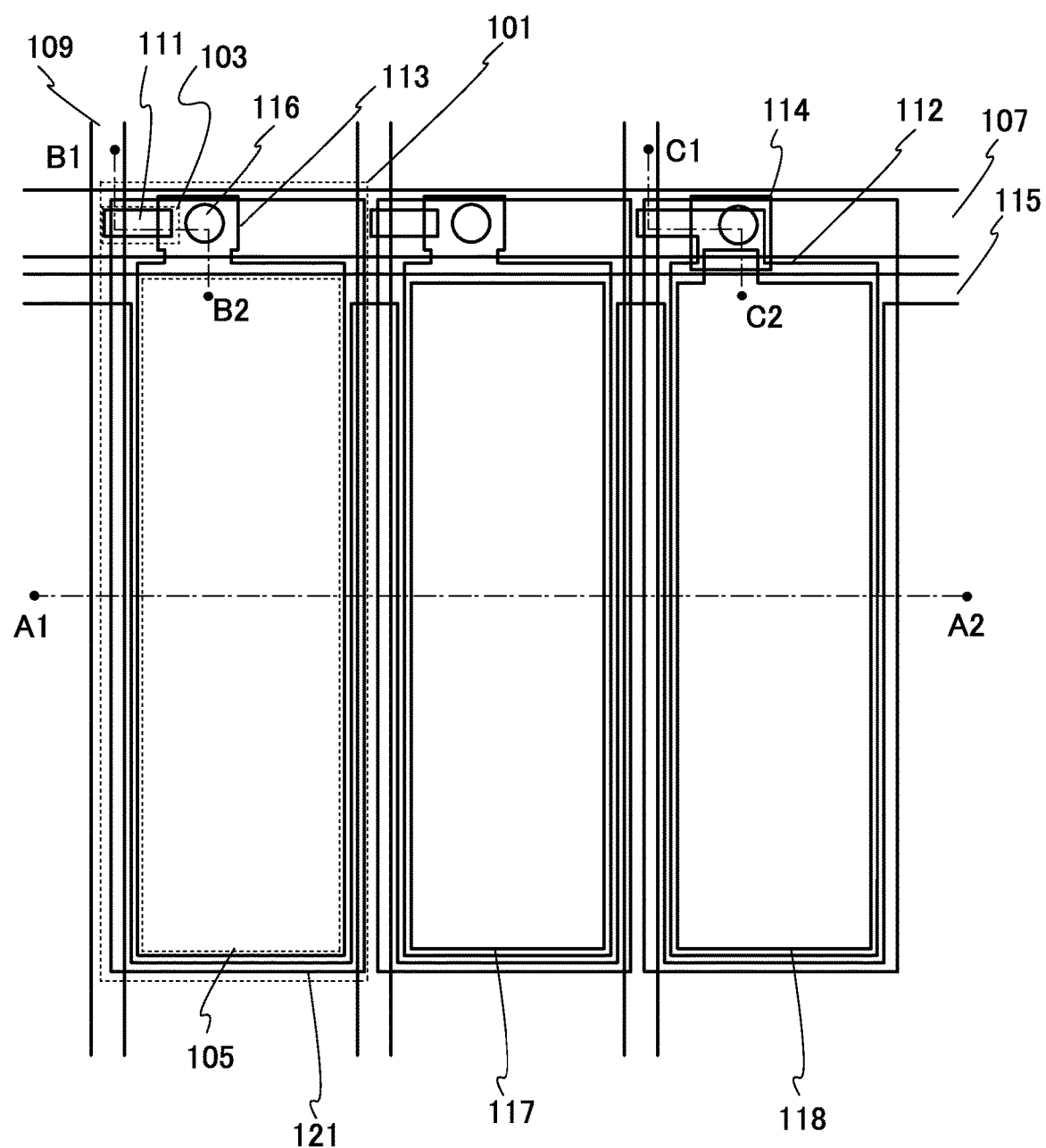
FIG. 1 is a top view illustrating a pixel and its periphery of a display device of one embodiment of the present invention.

Embodiments of the present invention will be described in detail below with reference to drawings. However, the present invention is not limited to the description below, and it is easily understood by those skilled in the art that modes and details disclosed herein can be modified in various ways. Furthermore, the present invention is not construed as being limited to description of the embodiments.

In the structures of the present invention described below, the same portions or portions having similar functions are denoted by the same reference numerals in different drawings, and description of such portions is not repeated. Furthermore, the same hatch pattern is applied to parts having similar functions, and the parts are not especially denoted by reference numerals in some cases.

In each drawing described in this specification, the size, the film thickness, or the region of each component is exaggerated for clarity in some cases. Therefore, embodiments and examples of the present invention are not necessarily limited to such scales.

Ordinal numbers such as "first" and "second" in this specification and the like are used for convenience and do not denote the order of steps or the stacking order of layers. Therefore, for example, the term "first" can be replaced with the term "second", "third", or the like as appropriate. In addition, the ordinal numbers in this specification and the like are not necessarily the same as the ordinal numbers used to specify one embodiment of the present invention.

Functions of a "source" and a "drain" in one embodiment of the present invention are sometimes replaced with each other when the direction of a current flowing is changed in circuit operation, for example. Therefore, the terms "source" and "drain" can be replaced with each other in this specification.

In this specification and the like, the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

In this specification and the like, the term "parallel" indicates that the angle formed between two straight lines is greater than or equal to −10° and less than or equal to 10°, and accordingly also includes the case where the angle is greater than or equal to −5° and less than or equal to 5°. In addition, the term "perpendicular" indicates that the angle formed between two straight lines is greater than or equal to 80° and less than or equal to 100°, and accordingly includes the case where the angle is greater than or equal to 85° and less than or equal to 95°.

In this specification, the metal oxide layer used as the OC electrode may also be referred to as semiconductor layer.

(Embodiment 1)

In this embodiment, a display device of one embodiment of the present invention is described with reference to FIGS. 1 to 4, FIGS. 5A to 5C, FIGS. 6A to 6C, FIGS. 7A to 7C, FIGS. 8A to 8C, FIGS. 9A to 9C, FIGS. 10A to 10C, FIGS. 11A to 11C, and FIGS. 12A to 12C, FIGS. 13A and 13B, FIG. 14, and FIGS. 20 and 21.

<Structural Example of Display Device>

FIG. 1 is a top view of a pixel and its periphery of a display device. Note that in the top view illustrated in FIG. 1, some components are not illustrated in order to avoid complexity of the drawing.

In FIG. 1, a pixel 101 is provided in a region defined by a scan line 107, a data line 109, and a capacitor line 115. The scan line 107 extends in the direction substantially perpendicular to the data line 109 (in the horizontal direction in the drawing). The data line 109 extends in the direction substantially perpendicular to the scan line 107 (in the vertical direction in the drawing). The capacitor line 115 extends in the direction substantially parallel to the scan line 107.

A transistor 103 is formed to overlap with the scan line 107 and provided in a region where the scan line 107 intersects with the data line 109. The transistor 103 includes at least a semiconductor layer 111 including a channel formation region, a gate electrode, a gate insulating layer (not illustrated in FIG. 1), a source electrode, and a drain electrode.

The scan line 107 also serves as the gate electrode of the transistor 103, and the data line 109 also serves as the source electrode of the transistor 103. A conductive layer 113 serves as the drain electrode of the transistor 103 and is electrically connected to a reflective electrode 121 through an opening 116. Furthermore, in some cases, the term "scan line 107" is used also to denote the gate electrode of the transistor 103 and the term "data line 109" is used also to denote the source electrode of the transistor 103 in the following description.

In a capacitor 105, the capacitor line 115 is used as one of electrodes of the capacitor 105, and an insulating layer in the same layer as the gate insulating layer is used as a dielectric of the capacitor. The capacitor line 115 is formed of a conductive layer in the same layer as the scan line 107. As the other of the electrodes of the capacitor 105, the conductive layer 113 is used. Furthermore, an opening 117 is formed to adjust the thicknesses of layers under the reflective electrode so that a cell gap can be adjusted. Furthermore, a semiconductor layer 112 is used as an electrode of a capacitor and an opening 118 is formed so that a cell gap can be adjusted. In this structure, a conductive layer 114 is not provided over the capacitor. Note that the openings 117 and 118 are formed by processing a conductive layer 113B, a conductive layer 113G, the conductive layer 114, and an insulating layer (not illustrated in FIG. 1) provided over the semiconductor layer 112.

Note that for the semiconductor layers 111 and 112, an oxide semiconductor is used.

Figure 2:
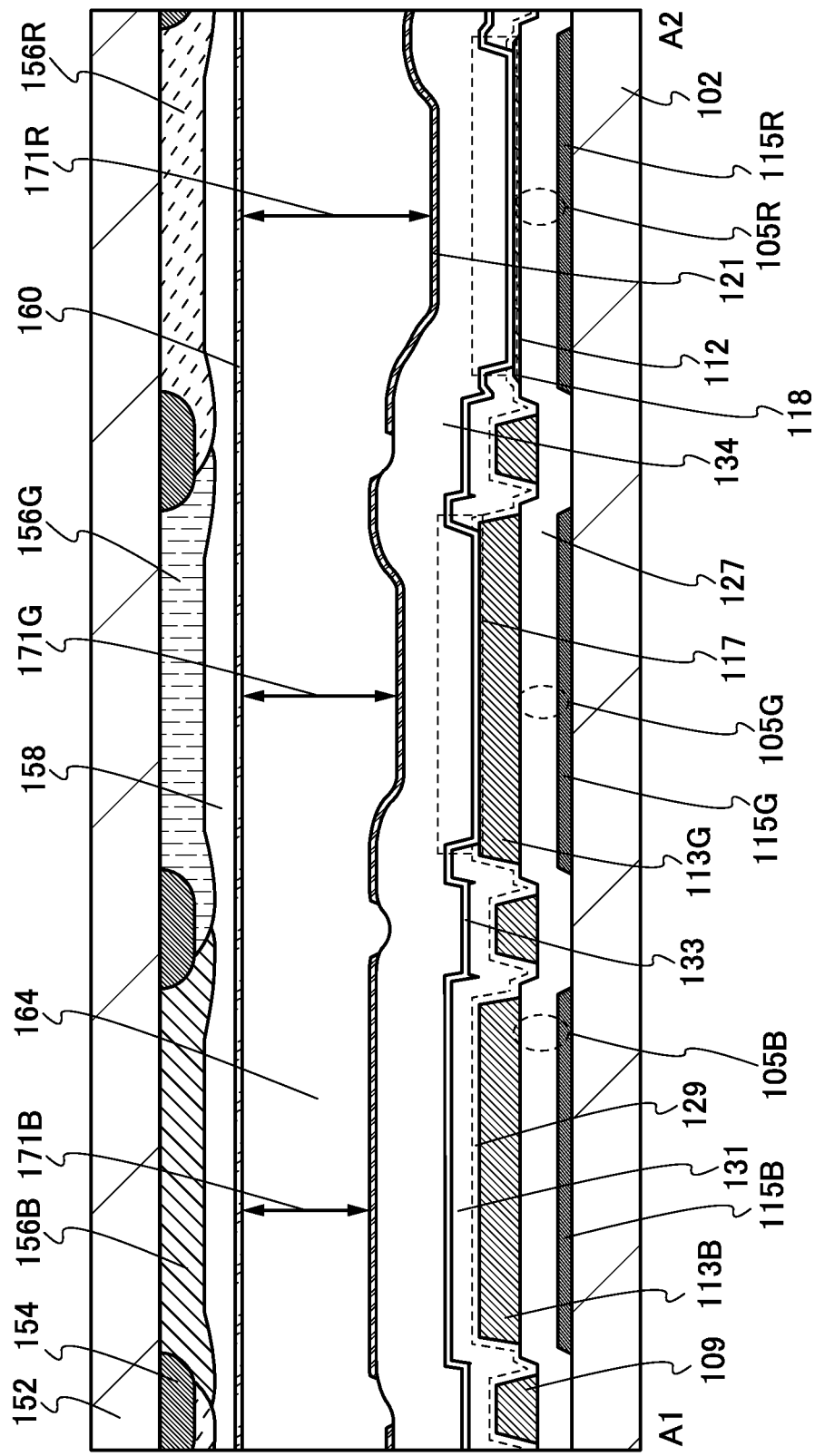
FIG. 2 is a cross-sectional view illustrating a pixel of a display device of one embodiment of the present invention.
Figure 3:
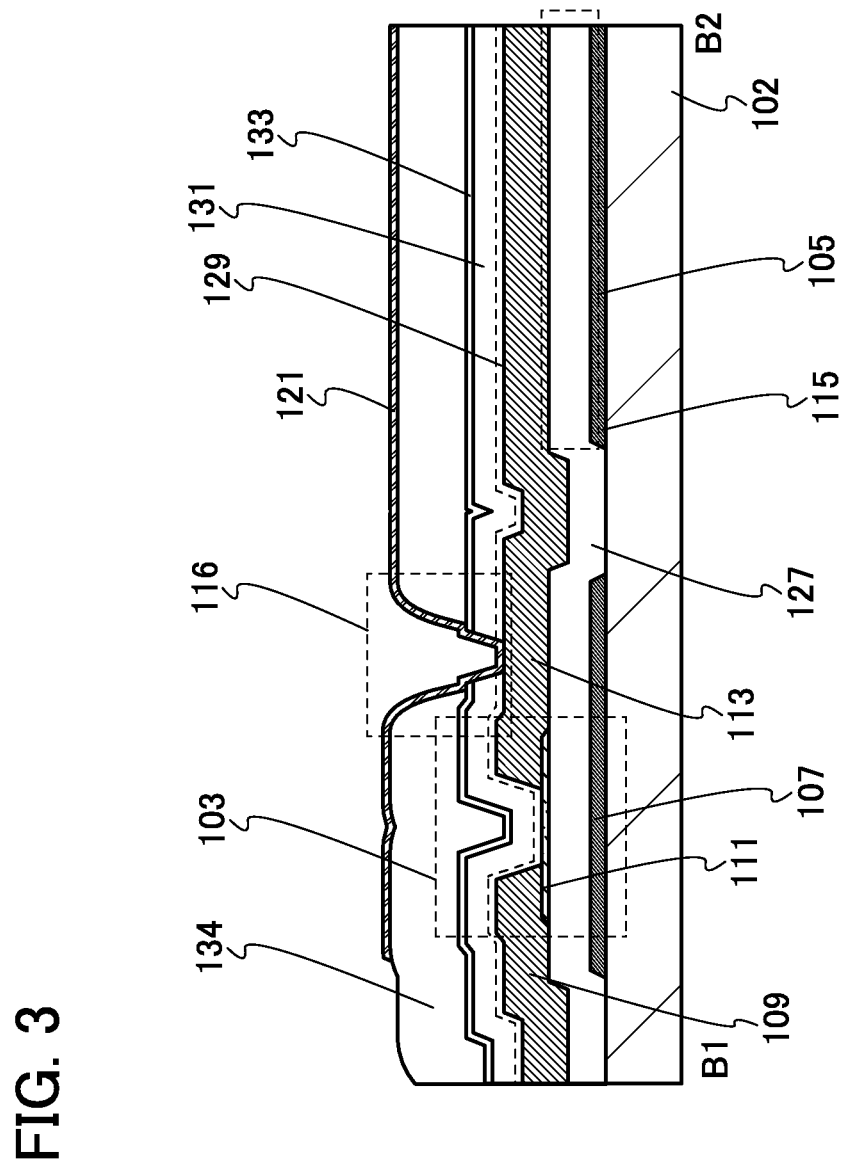
FIG. 3 is a cross-sectional view illustrating a pixel of a display device of one embodiment of the present invention.
Figure 4:
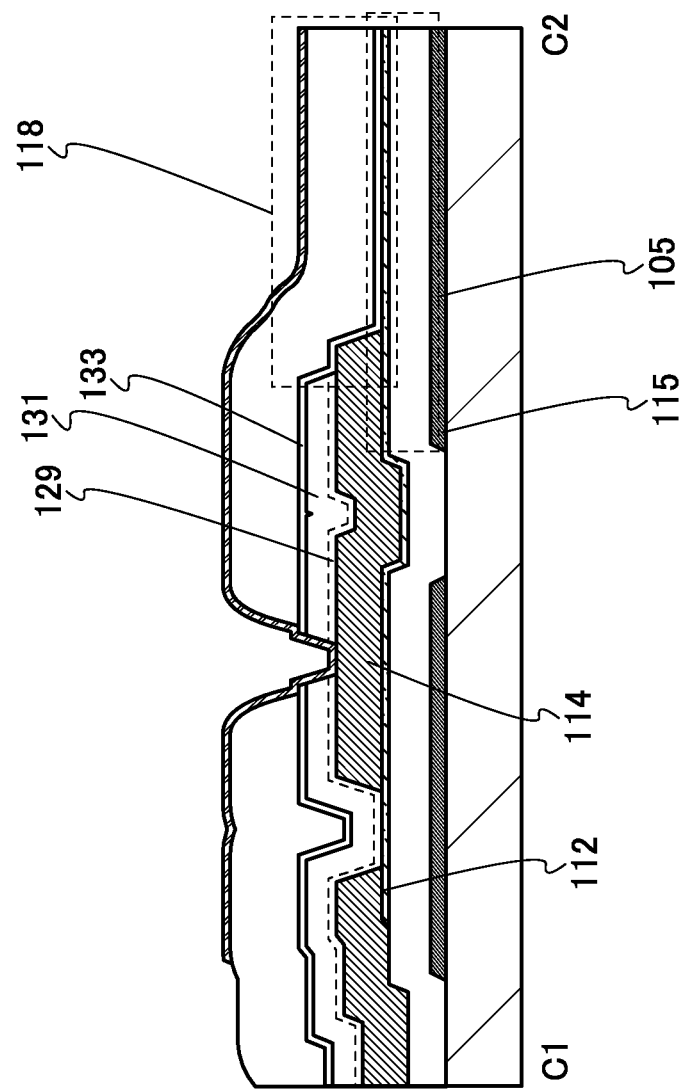
FIG. 4 is a cross-sectional view illustrating a pixel of a display device of one embodiment of the present invention.

Cross-sectional views taken along the dash-dot line A1-A2, the dash-dot line B1-B2, and the dash-dot line C1-C2 in FIG. 1 are illustrated in FIG. 2, FIG. 3, and FIG. 4, respectively.

The cross-sectional structure of the display device illustrated in FIG. 2 is described below.

Over the substrate 102, a capacitor line 115B, a capacitor line 115G, and a capacitor line 115R are provided. Over the capacitor lines 115B, 115G, and 115R, an insulating layer 127 functioning as the gate insulating layer of the transistor 103 is provided. Over the insulating layer 127, the data line 109, the conductive layers 113B and 113G, and the semiconductor layer 112 are provided. The conductive layer 113B overlaps with the capacitor line 115B to form the capacitor 105B, the conductive layer 113G overlaps with the capacitor line 115G to form the capacitor 105G, and the semiconductor layer 112 overlaps with the capacitor line 115R to form the capacitor 105R. Over the data line 109, the conductive layers 113B and 113G, and the semiconductor layer 112, an insulating layer 129 and an insulating layer 131 are provided. The insulating layers 129 and 131 function as the first interlayer insulating layer. The openings 117 and 118 reaching the conductive layer 113G and the semiconductor layer 112 respectively are formed in the insulating layers 129 and 131 so that part of end portions of the insulating layers 129 and 131 covers end portions of the conductive layer 113G and the semiconductor layer 112. An insulating layer 133 is formed so as to cover the insulating layer 131, the conductive layer 113G, and the semiconductor layer 112. The insulating layer 133 functions as a second interlayer insulating layer. Over the insulating layer 133, a planarization film 134 is provided. Over the planarization film 134, the reflective electrode 121 is provided. Over the planarization film 134 and the reflective electrode 121, an alignment film is provided but not illustrated in the figure.

A substrate 152 is provided to face the substrate 102. A liquid crystal layer 164 is interposed between the substrate 102 and the substrate 152. The substrate 152 is provided with a light-shielding layer 154, a coloring layer 156B, a coloring layer 156G, a coloring layer 156R, a planarization film 158, and a conductive layer 160. On the conductive layer 160, an alignment film is provided but not illustrated in the figure. Between the substrate 102 and the substrate 152, a spacer, which is not illustrated in the figure, is provided to adjust the cell gaps.

FIG. 2 illustrates, as an example, three pixels that vary in the thicknesses of the layers under the reflective electrodes and in the cell gap of the liquid crystal layer 164. A cell gap 171B, a cell gap 171G, and a cell gap 171R of these pixels can be obtained by varying the thicknesses of the insulating layers 129 and 131 (collectively referred to as first interlayer insulating layer), the semiconductor layer 112, and the conductive layer 113. Specifically, a difference between the cell gaps 171B and 171G can be adjusted by the thickness of the first interlayer insulating layer, and a difference between the cell gaps 171G and 171R can be adjusted by a difference in thickness between the conductive layer 113 and the semiconductor layer 112.

For example, the case of the three colors RGB is described. Based on calculation from Equation 1, where $\lambda_B$=450 nm, $\lambda_G$=540 nm, and $\lambda_R$=630 nm, the cell gaps for RGB are as follows: $d_B$=1406 nm, $d_G$=1688 nm, and $d_R$=1969 nm.

Specifically, the thickness of the first interlayer insulating layer (the total thickness of the insulating layers 129 and 131) is set to 282 nm, the thickness of the conductive layer 113 is set to 316 nm, and the thickness of the semiconductor layer 112 is set to 35 nm. Consequently, the difference between the cell gaps 171B and 171G is 282 nm corresponding to the thickness of the first interlayer insulating layer; the difference between the cell gaps 171B and 171R is 563 nm, which is obtained by adding the thickness (282 nm) of the first interlayer insulating layer to the thickness difference (281 nm) between the conductive layer 113 and the semiconductor layer 112. The height of the spacer is adjusted so that the cell gap 171B in the blue pixel is 1406 nm, so that the cell gap 171G in the green pixel and the cell gap 171R in the red pixel are 1688 nm and 1969 nm, respectively.

The planarization film 134, the coloring layers 156B, 156G, and 156R, the planarization film 158, and the like, which are formed by a coating method in many cases, might vary in thickness depending on the position because of unevenness of the coated surface or the coloring layers might have different thickness conditions. In such a case, the values of the cell gaps for RGB can be shifted from the values that are obtained without considering the effect of the planarization film 134, the coloring layers 156B, 156G, and 156R, and the planarization film 158. In this case, to obtain the values of the cell gaps calculated from Equation 1 as described above, the thicknesses of the planarization film 134, the coloring layers 156B, 156G, and 156R, and the planarization film 158 need to be taken into consideration for the adjustment of the thickness of the first interlayer insulating layer or the conductive layer 113.

The reflective electrodes of the RGB pixels are uniform in size in FIG. 1 but may vary in size.

Since the insulating layer 127 as the dielectric are shared by the capacitors 105B, 105G, and 105R, the capacitance values thereof can be substantially the same. Thus, display that is less affected by, for example, unevenness due to variation among colors can be obtained.

As described above, in the pixel of each of RGB in the color reflective liquid crystal display device of one embodiment of the present invention, the cell gap is adjusted so that the luminance can be maximized. Consequently, display with high contrast and high color reproducibility can be performed. Furthermore, the capacitances of RGB are substantially the same, so that display is less affected by unevenness due to variation among colors and can be uniform.

The RGB wavelengths can be set to the peak wavelengths of the transmittances of the respective color filters. In many cases, for example, the R transmittance becomes substantially constant on the long-wavelength side of a certain wavelength or more; in such a case, the R wavelength is set within the wavelength range where the transmittance is constant. Furthermore, since the transmittance of a color filter has a relatively broad spectrum peaking at a certain wavelength, the RGB wavelengths may each be set within the wavelength range of normalized transmittances of 0.95 or more assuming that the peak of the transmittance is 1. In other words, as long as the above conditions are satisfied, the cell gaps for RGB may have a margin.

When an oxide semiconductor layer is used as one of the electrodes of the capacitor, the oxide semiconductor layer needs to function as a conductive layer (OC electrode). A way of making the oxide semiconductor layer function as the conductive layer (OC electrode) is making the oxide semiconductor layer contact a conductive layer (metal) such as a source electrode or a drain electrode. In the contact surface and a region in the vicinity thereof, carriers are injected from the conductive layer (metal) to the oxide semiconductor layer, so that the oxide semiconductor layer can function as the conductive layer (OC electrode). Another way is making a silicon nitride-based insulating layer contact an oxide semiconductor layer in which an oxygen vacancy is formed. In the contact surface and a region in the vicinity thereof, hydrogen is injected from silicon nitride to an oxygen vacant site of the oxide semiconductor layer and carriers are formed, so that the oxide semiconductor layer can function as the conductive layer (OC electrode). To form an oxygen vacancy in the oxide semiconductor layer, for example, a silicon oxide-based insulating layer (referred to as first interlayer insulating layer) is formed over the oxide semiconductor and an opening is formed in the first interlayer insulating layer. In the opening, a silicon nitride-based insulating layer is formed as the second interlayer insulating layer. The silicon nitride-based insulating layer is preferably a film that releases a large amount of hydrogen.

The cross-sectional structure of the display device illustrated in FIG. 3 is described below.

The scan line 107 serving as the gate electrode of the transistor 103 is provided over a substrate 102. In addition, the capacitor line 115 formed in the same step as the scan line 107 is provided. The insulating layer 127 serving as the gate insulating layer of the transistor 103 is provided over the scan line 107 and the capacitor line 115. The semiconductor layer 111 is provided over the insulating layer 127 so as to overlap with the scan line 107, and serves as the semiconductor layer of the transistor 103. The data line 109 serving as the source electrode of the transistor 103 and the conductive layer 113 serving as the drain electrode of the transistor 103 are provided over the semiconductor layer 111 and the insulating layer 127. The insulating layers 129 and 131 serving as a protective insulating layer of the transistor 103 are provided over the data line 109, the semiconductor layer 111, and the conductive layer 113. The insulating layer 133 is formed so as to cover the insulating layers 129 and 131. The planarization film 134 is provided over the insulating layer 133. Over the planarization film 134, the reflective electrode 121 is provided. Furthermore, the opening 116 reaching the conductive layer 113 is formed in the insulating layers 129, 131, and 133 and the planarization film 134. The reflective electrode 121 is electrically connected to the conductive layer 113 through the opening 116. Over the planarization film 134 and the reflective electrode 121, the alignment film is provided but not illustrated in the figure. In the opening 116, an end portion of the planarization film 134 is provided over the insulating layer 133, but one embodiment of the present invention is not limited thereto; the end portion of the planarization film 134 may be provided over the conductive layer 113. The conductive layer 113 extends over the capacitor line 115 to form the capacitor 105.

The cross-sectional structure of the display device illustrated in FIG. 4 is described below. Note that only portions different from those in FIG. 3 are described here.

The semiconductor layer 112 extends from the channel formation region to a region over the capacitor line 115. In addition, the conductive layer 114 functioning as the drain electrode of the transistor is provided. Part of an end portion of the conductive layer 114 overlaps with the capacitor line 115. The opening 118 reaching the semiconductor layer 112 is formed in the insulating layers 129 and 131 so that part of the end portions of the insulating layers 129 and 131 is positioned over the conductive layer 114. The insulating layer 133 is provided so as to be in contact with a top surface of the semiconductor layer 112 and with a side surface of the conductive layer 114. The semiconductor layer 112 is in contact with the insulating layer 133 and the conductive layer 114 to function as the OC electrode. Although the semiconductor layer 112 extends from the channel formation region to the capacitor, one embodiment of the present invention is not limited thereto; the semiconductor layer 112 may be separated under the conductive layer 114.

Note that other components of the display device of one embodiment of the present invention illustrated in FIGS. 1 to 4 are described in detail in the next description of a method of manufacturing the display device.

<Method of Manufacturing Display Device>

A method of manufacturing the display device illustrated in FIGS. 1 to 4 is described below with reference to FIGS. 5A to 5C, FIGS. 6A to 6C, FIGS. 7A to 7C, FIGS. 8A to 8C, FIGS. 9A to 9C, FIGS. 10A to 10C, FIGS. 11A to 11C, and FIGS. 12A to 12C. Note that for FIGS. 5A to 12C, the cross-sectional structure of the display device illustrated in FIGS. 2 to 4 is described as an example. That is, FIG. 5A, FIG. 6A, FIG. 7A, FIG. 8A, FIG. 9A, FIG. 10A, FIG. 11A, and FIG. 12A are each a cross-sectional view taken along the dash-dot line A1-A2 in FIG. 1. FIG. 5B, FIG. 6B, FIG. 7B, FIG. 8B, FIG. 9B, FIG. 10B, FIG. 11B, and FIG. 12B are each a cross-sectional view taken along the dash-dot line B1-B2 in FIG. 1. FIG. 5C, FIG. 6C, FIG. 7C, FIG. 8C, FIG. 9C, FIG. 10C, FIG. 11C, and FIG. 12C are each a cross-sectional view taken along the dash-dot line C1-C2 in FIG. 1.

First, the substrate 102 is prepared. For the substrate 102, a glass material such as aluminosilicate glass, aluminoborosilicate glass, or barium borosilicate glass is used. In the mass production, for the substrate 102, a mother glass with any of the following sizes is preferably used: the 8th generation (2160 mm×2460 mm), the 9th generation (2400 mm×2800 mm, or 2450 mm×3050 mm), the 10th generation (2950 mm×3400 mm), and the like. A high process temperature and a long period of process time drastically shrink the mother glass. Thus, in the case where mass production is performed with the use of the mother glass, it is preferable that the heat process in the manufacturing process be performed at a temperature lower than or equal to 600° C., further preferably lower than or equal to 450° C., still further preferably lower than or equal to 350° C.

Next, as illustrated in FIGS. 5A to 5C, a conductive layer is formed over the substrate 102, and the conductive layer is processed so that desired regions remain. Thus, the scan line 107 and the capacitor line 115 are formed. After that, the insulating layer 127 is formed over the substrate 102, the scan line 107, and the capacitor line 115. Then, a semiconductor layer is formed over the insulating layer 127, and the semiconductor layer is processed so that desired regions remain. Thus, the semiconductor layers 111 and 112 are formed.

The scan line 107 and the capacitor line 115 can be formed using a metal element selected from aluminum, chromium, copper, tantalum, titanium, molybdenum, and tungsten, an alloy containing any of these metal elements as a component, an alloy containing these metal elements in combination, or the like. Furthermore, the scan line 107 and the capacitor line 115 may have a single-layer structure or a stacked-layer structure of two or more layers. For example, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, and the like can be given. Alternatively, a film, an alloy film, or a nitride film that contains aluminum and one or more selected from titanium, tantalum, tungsten, molybdenum, chromium, neodymium, and scandium may be used. Furthermore, the scan line 107 and the capacitor line 115 can be formed by a sputtering method, for example. For example, a 200-nm thick tungsten film is formed.

The insulating layer 127 is formed with a single-layer structure or a stacked-layer structure using, for example, any of a silicon nitride oxide film, a silicon nitride film, an aluminum oxide film, and the like with a PE-CVD apparatus. Preferably, a film that releases a small amount of hydrogen is used. In the case where the insulating layer 127 has a stacked-layer structure, it is preferable that a silicon nitride film with fewer defects be provided as a first silicon nitride film, and a silicon nitride film from which hydrogen and ammonia are less likely to be released be provided as a second silicon nitride film over the first silicon nitride film. As a result, hydrogen and nitrogen contained in the insulating layer 127 can be prevented from moving or diffusing into the semiconductor layers 111 and 112.

The insulating layer 127 is formed to have a single-layer structure or a stacked-layer structure using any of a silicon oxide film, a silicon oxynitride film, and the like with a PE-CVD apparatus.

The insulating layer 127 can have a stacked-layer structure, for example, in which a 400-nm-thick silicon nitride film and a 50-nm-thick silicon oxynitride film are formed in this order. The silicon nitride film and the silicon oxynitride film are preferably formed in succession in a vacuum so that fewer impurities are mixed into the films. Note that a portion of the insulating layer 127 that overlaps with the scan line 107 serves as the gate insulating layer of the transistor 103. Note that silicon nitride oxide refers to an insulating material that contains more nitrogen than oxygen, whereas silicon oxynitride refers to an insulating material that contains more oxygen than nitrogen.

The insulating layer 127 serves as the gate insulating layer of the transistor 103. When the gate insulating layer has the above structure, the following effects can be obtained, for example. The silicon nitride film has a higher dielectric constant than a silicon oxide film and needs a larger thickness for an equivalent capacitance. Thus, the physical thickness of the gate insulating layer can be increased. This makes it possible to reduce a decrease in the withstand voltage of the transistor 103 and furthermore increase the withstand voltage, thereby reducing electrostatic discharge damage to the transistor 103.

The semiconductor layers 111 and 112 are preferably formed using an oxide semiconductor. The oxide semiconductor preferably includes a film represented by an In-M-Zn oxide that contains at least indium (In), zinc (Zn), and M (M represents an element such as Al, Ga, Ge, Y, Zr, Sn, La, Ce, or Hf). Alternatively, both In and Zn are preferably contained. In order to reduce a variation in electrical characteristics among the transistors each including the oxide semiconductor, the oxide semiconductor preferably contains a stabilizer in addition to In and/or Zn.

Examples of the stabilizer include gallium (Ga), tin (Sn), hafnium (Hf), aluminum (Al), and zirconium (Zr). Other examples of the stabilizer include lanthanoids such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

As the oxide semiconductor included in the semiconductor layers 111 and 112, any of the following can be used: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that the In—Ga—Zn-based oxide refers to an oxide containing In, Ga, and Zn as its main components and there is no particular limitation on the ratio of In to Ga and Zn. The In—Ga—Zn-based oxide may contain a metal element other than the In, Ga, and Zn.

In the case where an In-M-Zn oxide is used as the semiconductor layers 111 and 112, the atomic ratio of metal elements of a sputtering target used for forming the In-M-Zn oxide preferably satisfies the following condition: In ≥M and Zn ≥M. As the atomic ratio of metal elements of such a sputtering target, it is preferable that In:M:Zn=1:1:1, In:M:Zn=1:1:1.2, In:M:Zn=3:1:2, and In:M:Zn=4:2:4.1. In the case where the In-M-Zn oxide is used as the semiconductor layers 111 and 112, it is preferable to use a target including a polycrystalline In-M-Zn oxide as the sputtering target. The use of the target including a polycrystalline In-M-Zn oxide facilitates formation of an oxide semiconductor film having crystallinity. Note that the atomic ratios of the metal elements in the formed oxide semiconductor film vary from those in the above-described sputtering target, within a range of ±40% as an error.

When the oxide semiconductor film is used for the semiconductor layers 111 and 112, the energy gap of the oxide semiconductor is 2 eV or more, more preferably 2.5 eV or more, more preferably 3 eV or more. The use of such an oxide semiconductor having an energy gap can reduce the off-state current of the transistor.

For the oxide semiconductor film for the semiconductor layers 111 and 112, an oxide semiconductor film with a low carrier density is used. For example, an oxide semiconductor film whose carrier density is lower than or equal to $1\times10^{17}/cm^3$, preferably lower than or equal to $1\times10^{15}/cm^3$, further preferably lower than or equal to $1\times10^{13}/cm^3$, still further preferably lower than or equal to $1\times10^{11}/cm^3$ is used for the semiconductor layers 111 and 112.

When the oxide semiconductor film is used for the semiconductor layers 111 and 112, an oxide semiconductor film with a low impurity concentration and a low density of defect states is preferably used as the oxide semiconductor film, in which case the transistor can have more excellent electrical characteristics. Here, the state in which the impurity concentration is low and the density of defect states is low (the number of oxygen vacancies is small) is referred to as "highly purified intrinsic" or "substantially highly purified intrinsic". A highly purified intrinsic or substantially highly purified intrinsic oxide semiconductor film has few carrier generation sources, and thus can have a low carrier density. Thus, a transistor whose channel formation region is formed in the oxide semiconductor film rarely has a negative threshold voltage (is rarely normally on). A highly purified intrinsic or substantially highly purified intrinsic oxide semiconductor film has a low density of defect states and accordingly has few carrier traps in some cases. Furthermore, the highly purified intrinsic or substantially highly purified intrinsic oxide semiconductor film has an extremely low off-state current; even when an element has a channel width of $1\times10^6$ mm and a channel length (L) of 10 μm, the off-state current can be less than or equal to the measurement limit of a semiconductor parameter analyzer, i.e., less than or equal to $1\times10^{-13}$ A, at a voltage (drain voltage) between a source electrode and a drain electrode of from 1 V to 10 V.

Accordingly, the transistor whose channel formation region is formed in the highly purified intrinsic or substantially highly purified intrinsic oxide semiconductor film can have a small variation in electrical characteristics and high reliability. Charges trapped by the trap states in the oxide semiconductor film take a long time to be released and may behave like fixed charges. Thus, the transistor whose channel formation region is formed in the oxide semiconductor film having high density of trap states has unstable electrical characteristics in some cases. Examples of the impurities are hydrogen, nitrogen, alkali metals, alkaline earth metals, and the like.

Hydrogen contained in the oxide semiconductor film reacts with oxygen bonded to a metal atom to be water, and also causes oxygen vacancies in a lattice from which oxygen is released (or a portion from which oxygen is released). Due to entry of hydrogen into the oxygen vacancy, an electron serving as a carrier is generated in some cases. Furthermore, in some cases, bonding of part of hydrogen to oxygen bonded to a metal element causes generation of an electron serving as a carrier. Thus, a transistor including an oxide semiconductor film which contains hydrogen is likely to be normally on. Accordingly, it is preferable that hydrogen be reduced as much as possible in the oxide semiconductor film. Specifically, in the oxide semiconductor film, the concentration of hydrogen which is measured by SIMS analysis is lower than or equal to $2\times10^{20}$ atoms/cm$^3$, preferably lower than or equal to $5\times10^{19}$ atoms/cm$^3$, further preferably lower than or equal to $1\times10^{19}$ atoms/cm$^3$, further preferably lower than or equal to $5\times10^{18}$ atoms/cm$^3$, further preferably lower than or equal to $1\times10^{18}$ atoms/cm$^3$, further preferably lower than or equal to $5\times10^{17}$ atoms/cm$^3$, further preferably lower than or equal to $1\times10^{16}$ atoms/cm$^3$.

The semiconductor layers 111 and 112 can be formed by a sputtering method, a molecular beam epitaxy (MBE) method, a CVD method, a pulsed laser deposition method, an atomic layer deposition (ALD) method, or the like as appropriate. Particularly when the oxide semiconductor film is used for the semiconductor layers 111 and 112, a sputtering method is preferably used. By a sputtering method, an oxide semiconductor film including a crystal can be easily formed.

The thicknesses of the semiconductor layers 111 and 112 are each preferably greater than or equal to 20 nm and less than or equal to 100 nm, more preferably greater than or equal to 30 nm and less than or equal to 50 nm, for example, 35 nm.

In the formation of the oxide semiconductor film for the semiconductor layers 111 and 112, the hydrogen concentration in the oxide semiconductor film is preferably reduced as much as possible. To reduce the hydrogen concentration, for example, in the case of a sputtering method, a deposition chamber needs to be evacuated to a high vacuum and also a sputtering gas needs to be highly purified. As an oxygen gas or an argon gas used for a sputtering gas, a gas which is highly purified to have a dew point of −40° C. or lower, preferably −80° C. or lower, further preferably −100° C. or lower, or still further preferably −120° C. or lower is used, whereby entry of moisture or the like into the oxide semiconductor film can be minimized.

In order to remove moisture remaining in the deposition chamber, an entrapment vacuum pump such as a cryopump, an ion pump, or a titanium sublimation pump is preferably used. A turbo molecular pump provided with a cold trap may be alternatively used. When the deposition chamber is evacuated with a cryopump, which has a high capability in removing a compound including a hydrogen atom such as water ($H_2O$), a compound including a carbon atom, and the like, the concentration of an impurity to be contained in a film formed in the deposition chamber can be reduced.

When the oxide semiconductor film for the semiconductor layers 111 and 112 is formed by a sputtering method, the relative density (filling factor) of a metal oxide target that is used for the film formation is greater than or equal to 90% and less than or equal to 100%, preferably greater than or equal to 95% and less than or equal to 100%. With the use of the metal oxide target having high relative density, a dense oxide semiconductor film can be formed.

Note that to reduce the impurity concentration of the oxide semiconductor film, it is also effective to form the oxide semiconductor film as the semiconductor layers 111 and 112 while the substrate 102 is kept at high temperature. The temperature at which the substrate 102 is heated may be higher than or equal to 150° C. and lower than or equal to 450° C.; the substrate temperature is preferably higher than or equal to 200° C. and lower than or equal to 350° C.

Next, first heat treatment is preferably performed. The first heat treatment may be performed at a temperature higher than or equal to 250° C. and lower than or equal to 650° C., preferably higher than or equal to 300° C. and lower than or equal to 500° C., in an inert gas atmosphere, an atmosphere containing an oxidizing gas at 10 ppm or more, or a reduced pressure state. Alternatively, the first heat treatment may be performed in such a manner that heat treatment is performed in an inert gas atmosphere, and then another heat treatment is performed in an atmosphere containing an oxidizing gas at 10 ppm or more, in order to compensate for desorbed oxygen. By the first heat treatment, the crystallinity of the oxide semiconductor that is used for the semiconductor layers 111 and 112 can be improved, and in addition, impurities such as hydrogen and water can be removed from the insulating layer 127 and the semiconductor layers 111 and 112. The first heat treatment may be performed before processing into the semiconductor layers 111 and 112 having an island shape.

Next, as illustrated in FIGS. 6A to 6C, a conductive film is formed over the insulating layer 127 and the semiconductor layers 111 and 112, and the conductive film is processed so that desired regions remain. Thus, the data line 109 and the conductive layers 113B, 113G, and 114 are formed. At this stage, the transistor 103 is formed. Furthermore, the capacitors 105B and 105G are formed. Note that the conductive layer 114 extends over a region overlapping with the capacitor line 115.

The data line 109 and the conductive layers 113B, 113G, and 114 can be formed using the conductive film having a single-layer structure or a stacked-layer structure with any of metals such as aluminum, titanium, chromium, nickel, copper, yttrium, zirconium, molybdenum, silver, tantalum, and tungsten, or an alloy containing any of these metals as its main component. For example, a two-layer structure in which a titanium film is stacked over an aluminum film, a two-layer structure in which a titanium film is stacked over a tungsten film, a two-layer structure in which a copper film is formed over a copper-magnesium-aluminum alloy film, a three-layer structure in which a titanium film or a titanium nitride film, an aluminum film or a copper film, and a titanium film or a titanium nitride film are stacked in this order, a three-layer structure in which a molybdenum film or a molybdenum nitride film, an aluminum film or a copper film, and a molybdenum film or a molybdenum nitride film are stacked in this order, and the like can be given. Note that a transparent conductive material containing indium oxide, tin oxide, or zinc oxide may be used. The conductive film can be formed by a sputtering method, for example. Note that the thickness of the data line 109 and the conductive layers 113B, 113G, and 114 is adjusted in consideration of the desired cell gap and the thickness of the semiconductor layers 111 and 112 and here is set to 316 nm.

Figure 7A:
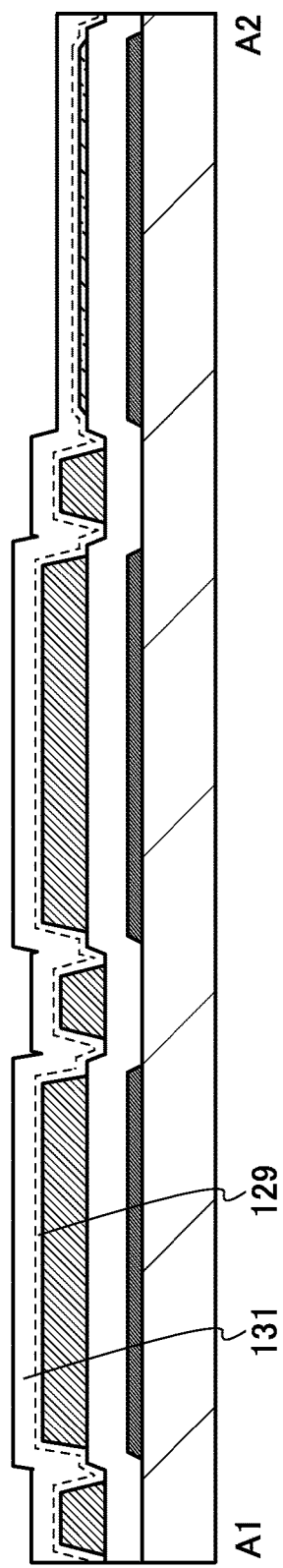
FIGS. 7A to 7C are cross-sectional views illustrating a method of manufacturing a display device of one embodiment of the present invention.
Figure 7B:
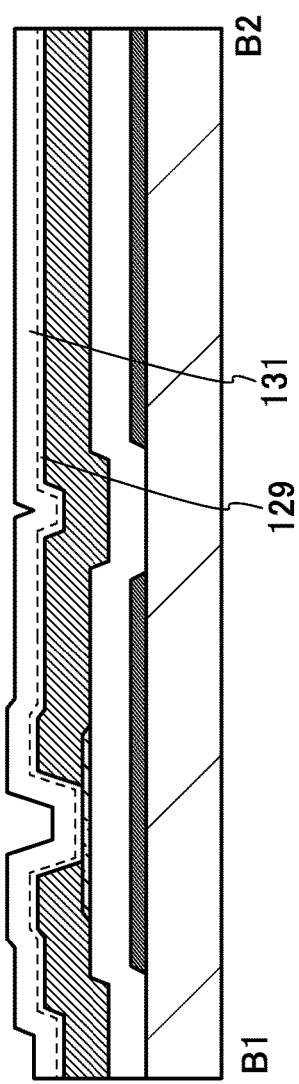
Figure 7C:
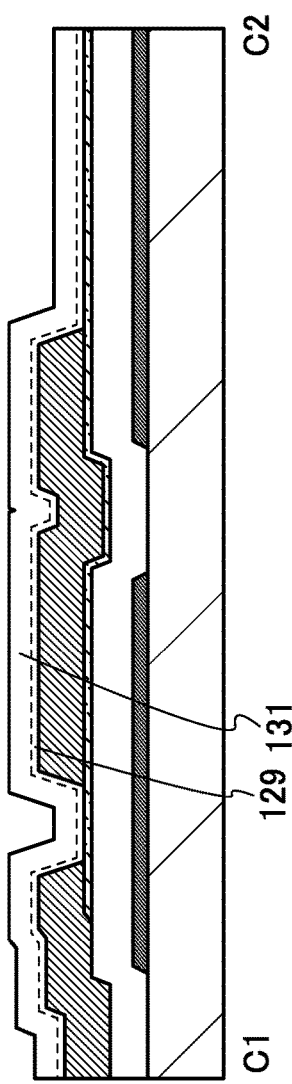

Next, as illustrated in FIGS. 7A to 7C, the insulating layers 129 and 131 are formed over the insulating layer 127, the semiconductor layers 111 and 112, the data line 109, and the conductive layers 113B, 113G, and 114.

For the insulating layers 129 and 131, an inorganic insulating material containing oxygen can be used in order to improve the characteristics of the interface with the oxide semiconductor used for the semiconductor layers 111 and 112. The insulating layers 129 and 131 can be formed by a PE-CVD method, for example.

The thickness of the insulating layer 129 can be greater than or equal to 5 nm and less than or equal to 150 nm, preferably greater than or equal to 5 nm and less than or equal to 50 nm, more preferably greater than or equal to 10 nm and less than or equal to 30 nm. The thickness of the insulating layer 131 can be greater than or equal to 30 nm and less than or equal to 500 nm, preferably greater than or equal to 150 nm and less than or equal to 400 nm. Note that the thicknesses of the insulating layers 129 and 131 are adjusted in consideration of the desired cell gap and the thickness of the semiconductor layers 111 and 112. Here, the thicknesses of the insulating layers 129 and 131 are set to 30 nm and 252 nm, respectively. That is, the thickness of the first interlayer insulating layer (the total thickness of the insulating layers 129 and 131) is set to 282 nm.

Furthermore, the insulating layers 129 and 131 can be formed using insulating layers formed of the same kinds of materials; thus, a boundary between the insulating layer 129 and the insulating layer 131 cannot be clearly observed in some cases. Thus, in this embodiment, the boundary between the insulating layer 129 and the insulating layer 131 is shown by a dashed line. Although a two-layer structure of the insulating layers 129 and 131 is described in this embodiment, the present invention is not limited to this. For example, a single-layer structure of the insulating layer 129, a single-layer structure of the insulating layer 131, or a stacked-layer structure including three or more layers may be used.

Figure 8A:
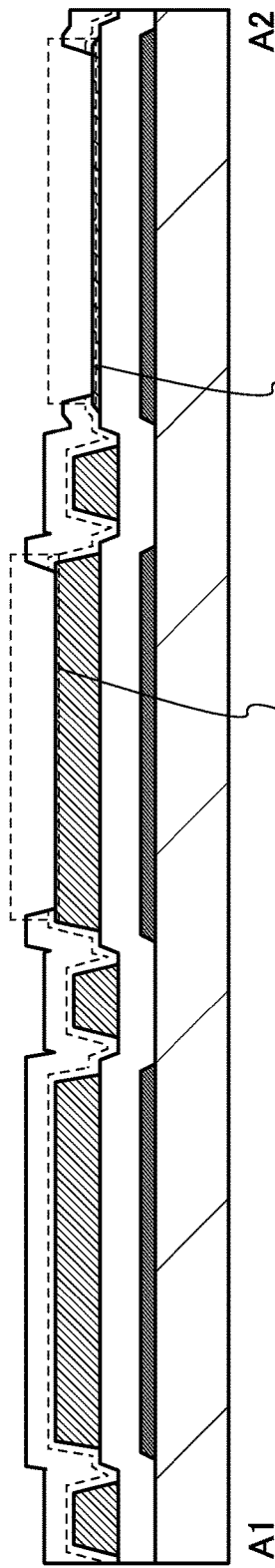
FIGS. 8A to 8C are cross-sectional views illustrating a method of manufacturing a display device of one embodiment of the present invention.
Figure 8B:
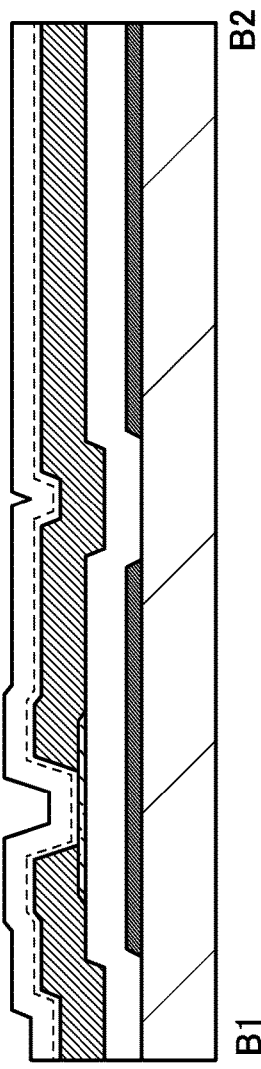
Figure 8C:
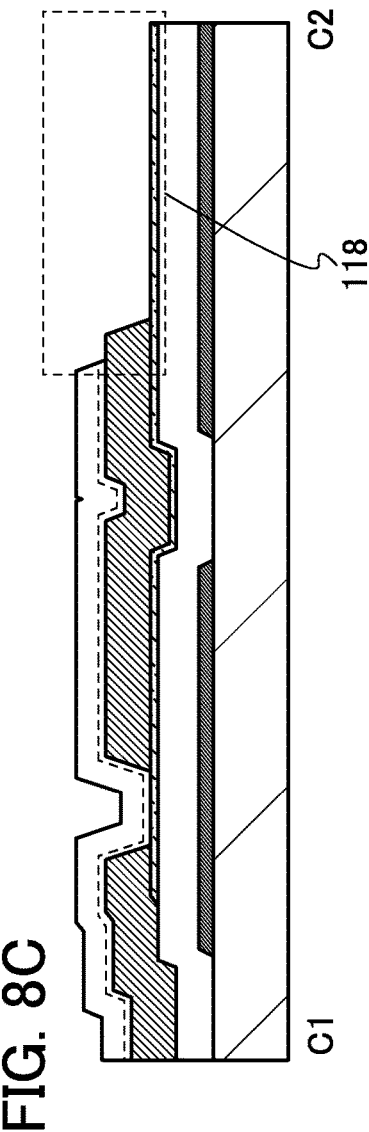

Next, as illustrated in FIGS. 8A to 8C, the insulating layers 129 and 131 are processed so that desired regions remain. Thus, the openings 117 and 118 are formed. By formation of the openings 117 and 118, a depressed portion is formed in the insulating layers 129 and 131.

Although the number of masks increases by a mask for forming the openings 117 and 118 compared with the number of masks for a normal reflective liquid crystal display device, this increase of one mask enables the three different cell gaps to be obtained.

Note that the openings 117 and 118 are formed to expose at least the conductive layer 113G and the semiconductor layer 112. In this embodiment, the openings 117 and 118 enable the pixels to have different cell gaps. The openings 117 and 118 can be formed by a dry etching method, for example. Note that the method of forming the openings 117 and 118 is not limited to the dry etching method, and a wet etching method or a combination of dry etching and wet etching may be employed. Etching conditions are selected such that the insulating layers 129 and 131 are etched but both the conductive layer 113G and the semiconductor layer 112 are less likely to be etched.

The openings 117 and 118 are preferably formed over the conductive layer 113G and the semiconductor layer 112, respectively, so that part of the end portions of the insulating layers 129 and 131 cover the end portions of the conductive layer 113G and the semiconductor layer 112. If the end portions of the conductive layer 113G and the semiconductor layer 112 are not covered, the insulating layer 127 might be etched during etching of the insulating layers 129 and 131. If the insulating layer 127 is etched, coverage by the insulating layer 133 formed later might result in failure and reduce reliability.

For example, in the case where a dry etching method is used as a method of forming the openings 117 and 118, oxygen vacancies may be formed in the oxide semiconductor film.

Note that elements that form oxygen vacancies in the oxide semiconductor film are described as impurity elements. Typical examples of the impurity elements are hydrogen, boron, carbon, nitrogen, fluorine, aluminum, silicon, phosphorus, chlorine, and rare gas elements. Typical examples of the rare gas elements are helium, neon, argon, krypton, and xenon.

As in FIG. 8C, part of an end portion of the opening 118 is preferably formed in a top surface of the conductive layer 114. This is because, if the opening 118 is formed so that the insulating layers 129 and 131 cover a side surface of the conductive layer 114, the resistance of a portion of the semiconductor layer 112 which is in contact with the insulating layers 129 and 131 is increased, which might cause a failure to make the semiconductor layer 112 function as the conductive layer (OC electrode).

Next, as illustrated in FIGS. 9A to 9C, the insulating layer 133 is formed so as to cover the insulating layer 131, the conductive layer 113G, the semiconductor layer 112, and the openings 117 and 118.

The insulating layer 133 is a film formed using a material that can prevent an external impurity, such as water, alkali metal, or alkaline earth metal, from diffusing into the oxide semiconductor layer, and that further contains hydrogen. Thus, when hydrogen in the insulating layer 133 is diffused to the semiconductor layer 112, hydrogen is bonded to oxygen or to oxygen vacancies to generate electrons that are carriers in the semiconductor layer 112. As a result, the conductivity of the semiconductor layer 112 is increased, so that the semiconductor layer 112 functions as the conductive layer (OC electrode). When the semiconductor layer 112 functions as the conductive layer (OC electrode), the capacitor 105R is formed.

When hydrogen is added to an oxide semiconductor including oxygen vacancies, hydrogen enters oxygen vacant sites and forms a donor level in the vicinity of the conduction band. As a result, the conductivity of the oxide semiconductor is increased, so that the oxide semiconductor becomes a conductor. Note that an oxide semiconductor having become a conductor can be referred to as oxide conductor (OC). Oxide semiconductors generally have a visible light transmitting property because of their large energy gap. An oxide conductor is an oxide semiconductor having a donor level in the vicinity of the conduction band. Therefore, the influence of absorption due to the donor level is small, and an oxide conductor has a visible light transmitting property comparable to that of an oxide semiconductor.

For example, a silicon nitride film, a silicon nitride oxide film, or the like having a thickness greater than or equal to 100 nm and less than or equal to 400 nm can be used as the insulating layer 133. In this embodiment, a 100-nm-thick silicon nitride film is used as the insulating layer 133.

The silicon nitride film is preferably formed at a high temperature to have an improved blocking property; for example, the silicon nitride film is preferably formed at a temperature in the range from the substrate temperature of 100° C. to the strain point of the substrate, more preferably at a temperature in the range from 300° C. to 400° C. When the silicon nitride film is formed at a high temperature, a phenomenon in which oxygen is released from the oxide semiconductor used for the semiconductor layer 111 and the carrier concentration is increased is caused in some cases; therefore, the upper limit of the temperature is a temperature at which the phenomenon is not caused.

Next, as illustrated in FIGS. 10A to 10C, an opening 181 and an opening 182 are formed in the insulating layers 129, 131, and 133.

The openings 181 and 182 are formed to expose the conductive layers 113 and 114. The openings 181 and 182 can be formed by a dry etching method, for example. Note that the method of forming the openings 181 and 182 is not limited thereto, and a wet etching method or a combination of dry etching and wet etching can be employed.

Next, as illustrated in FIGS. 11A to 11C, the planarization film 134 is formed so as to cover the insulating layer 133. The planarization film 134 includes openings 119 overlapping with the openings 181 and 182, and the opening 116 reaching the conductive layer 113 or the conductive layer 114 is formed. In the opening 116, the end portion of the planarization film 134 is provided over the insulating layer 133, but one embodiment of the present invention is not limited thereto; the end portion of the planarization film 134 may be provided over the conductive layer 113 or the conductive layer 114.

The planarization film 134 can be formed using a heat-resistant organic material, such as a polyimide resin, an acrylic resin, a polyimide amide resin, a benzocyclobutene resin, a polyamide resin, or an epoxy resin. Note that the planarization film 134 may be formed by stacking a plurality of insulating layers formed using any of these materials.

Next, as illustrated in FIGS. 12A to 12C, a conductive layer is formed over the planarization film 134 so as to cover the opening 116, and the conductive layer is processed so that desired regions remain. Thus, the reflective electrode 121 is formed.

As the conductive layer that can be used as the reflective electrode 121, a conductive film that reflects visible light can be used. For example, a material including aluminum or silver is preferably used as the conductive film. Furthermore, the conductive layer that can be used as the reflective electrode 121 can be formed by a sputtering method, for example.

Next, a structure with which the substrate 152 facing the substrate 102 is provided is described below.

Figure 13A:
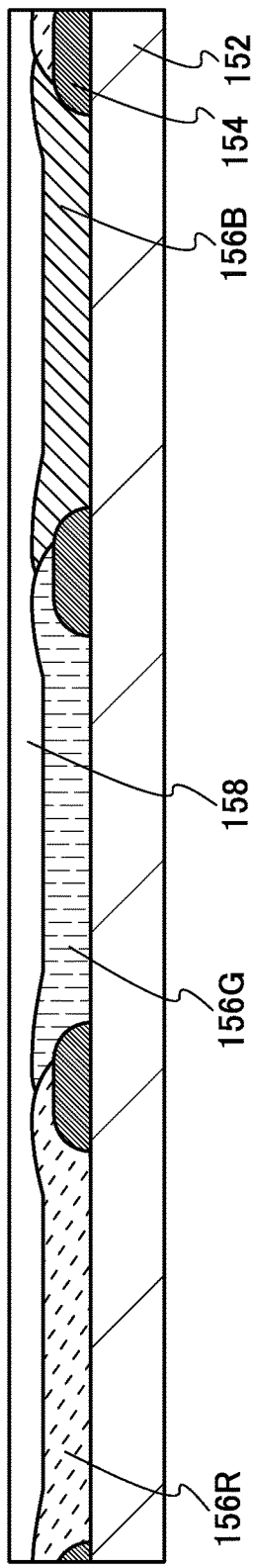
FIGS. 13A and 13B are cross-sectional views illustrating a method of manufacturing a display device of one embodiment of the present invention.

First, as illustrated in FIG. 13A, the substrate 152 is prepared. For the substrate 152, the materials that can be used for the substrate 102 can be referred to. Next, over the substrate 152, the light-shielding layer 154, the coloring layer 156R, the coloring layer 156G, the coloring layer 156B, and the planarization film 158 are formed.

The light-shielding layer 154 preferably has a function of blocking light in a particular wavelength range, and can be formed using an organic insulating layer including a black pigment or the like. The coloring layers 156R, 156G, and 156B are each a coloring layer that transmits light in a specific wavelength range. For example, a red (R) color filter for transmitting light in a red wavelength range, a green (G) color filter for transmitting light in a green wavelength range, a blue (B) color filter for transmitting light in a blue wavelength range, or the like can be used. The light-shielding layer 154 and the coloring layers 156R, 156G, and 156B are each formed in a desired position with any of various materials by a printing method, an inkjet method, an etching method using a photolithography technique, or the like.

For the planarization film 158, for example, an organic insulating layer of an acrylic-based resin or the like can be used. With the planarization film 158, impurities or the like contained in the coloring layer 156 can be prevented from diffusing into the liquid crystal layer 164 side, for example. Note that the planarization film 158 is not necessarily formed.

Figure 13B:
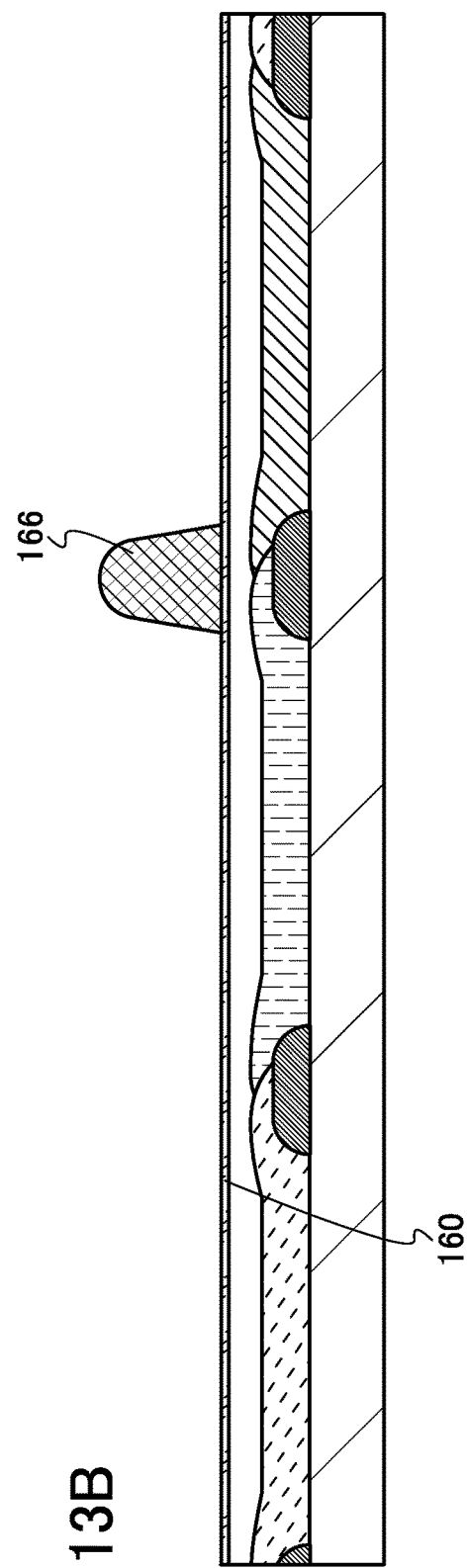

Next, the conductive layer 160 is formed over the planarization film 158, as illustrated in FIG. 13B. Then, a spacer 166 is formed in a desired region over the conductive layer 160.

The conductive layer 160 can be formed using a light-transmitting conductive material such as indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, or indium tin oxide to which silicon oxide is added. Furthermore, the conductive layer that can be used for the conductive layer 160 can be formed by a sputtering method, for example.

The spacer 166 is a columnar spacer obtained by selective patterning of an insulating layer and is provided in order to control the thickness (cell gap) of the liquid crystal layer 164. For example, the spacer 166 is preferably a columnar spacer in the shape of a circle, an ellipse, a triangle, a quadrangle, or a polygon with more than four corners. The spacer 166 can be formed using, for example, an organic material such as an acrylic-based resin or a polyimide-based resin, or an inorganic material such as a silicon oxide film, a silicon oxynitride film, a silicon nitride film, a silicon nitride oxide film, an aluminum oxide film, or an aluminum nitride film. The thickness (also referred to as height) of the spacer 166 is more than or equal to 0.5 µm and less than or equal to 10 µm, preferably more than or equal to 1.0 µm and less than or equal to 4 µm. The height of the spacer 166 is adjusted so that the cell gap can be set as desired.

Through the above steps, the structure formed over the substrate 152 can be formed.

Next, the alignment films are formed over the substrate 102 and over the substrate 152. The alignment films can be formed by a coating method or the like. After that, the liquid crystal layer 164 is formed between the substrate 102 and the substrate 152. The liquid crystal layer 164 can be formed by a dispenser method (a dropping method), or an injecting method in which a liquid crystal is injected using a capillary phenomenon after the substrate 102 and the substrate 152 are bonded to each other.

As the liquid crystal used for the liquid crystal layer 164, a liquid crystal material such as thermotropic liquid crystal, low-molecular liquid crystal, high-molecular liquid crystal, polymer dispersed liquid crystal, ferroelectric liquid crystal, or anti-ferroelectric liquid crystal can be used. Such a liquid crystal material exhibits a cholesteric phase, a smectic phase, a cubic phase, a chiral nematic phase, an isotropic phase, or the like depending on conditions.

As an operation mode of the liquid crystal layer 164, a twisted nematic (TN) mode, a vertical alignment (VA) mode, or the like can be used. There are some examples of the vertical alignment mode; for example, a multi-domain vertical alignment (MVA) mode, a patterned vertical alignment (PVA) mode, an ASV mode, or the like can be employed.

As the operation mode of the liquid crystal layer 164, an in-plane-switching (IPS) mode, a fringe field switching (FFS) mode, an axially symmetric aligned micro-cell (ASM) mode, an optical compensated birefringence (OCB) mode, a ferroelectric liquid crystal (FLC) mode, an antiferroelectric liquid crystal (AFLC) mode, or the like can also be used.

Through the above process, the display device illustrated in FIG. 2 can be manufactured.

<Modification Example 1>

Here, a cross-sectional view of a modification example of the pixels and their periphery in the display device illustrated in FIG. 2 is described with reference to FIG. 14.

Figure 14:
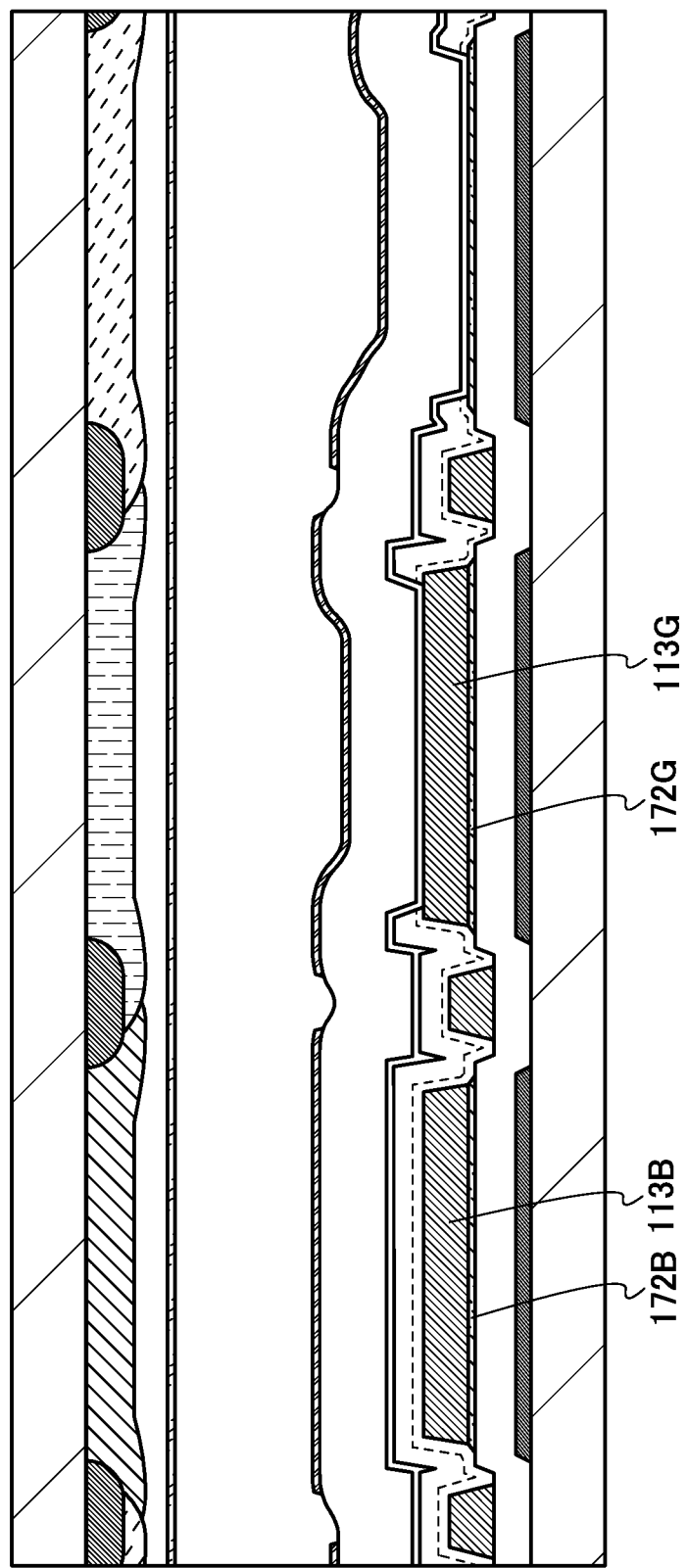
FIG. 14 is a cross-sectional view illustrating a pixel of a display device of one embodiment of the present invention.

The cross-sectional view of the pixels and their periphery of the display device in FIG. 14 is different from that in FIG. 2 in that a semiconductor layer 172B and a semiconductor layer 172G are provided under the conductive layer 113B and the conductive layer 113G, respectively.

The semiconductor layers 172B and 172G and the conductive layers 113B and 113G may be processed with different masks, or with one mask through two-step etching treatment by using a half-tone mask or a gray-tone mask. The use of a half-tone mask or a gray-tone mask can reduce the number of masks by one.

<Modification Example 2>

By combining the structure in FIG. 2 with that in FIG. 14, five types of cell gaps can be obtained to correspond to four or five colors.

<Modification Example 3>

Here, a cross-sectional view of a modification example of the pixels and their periphery in the display device illustrated in FIG. 2 is described with reference to FIG. 20.

Figure 20:
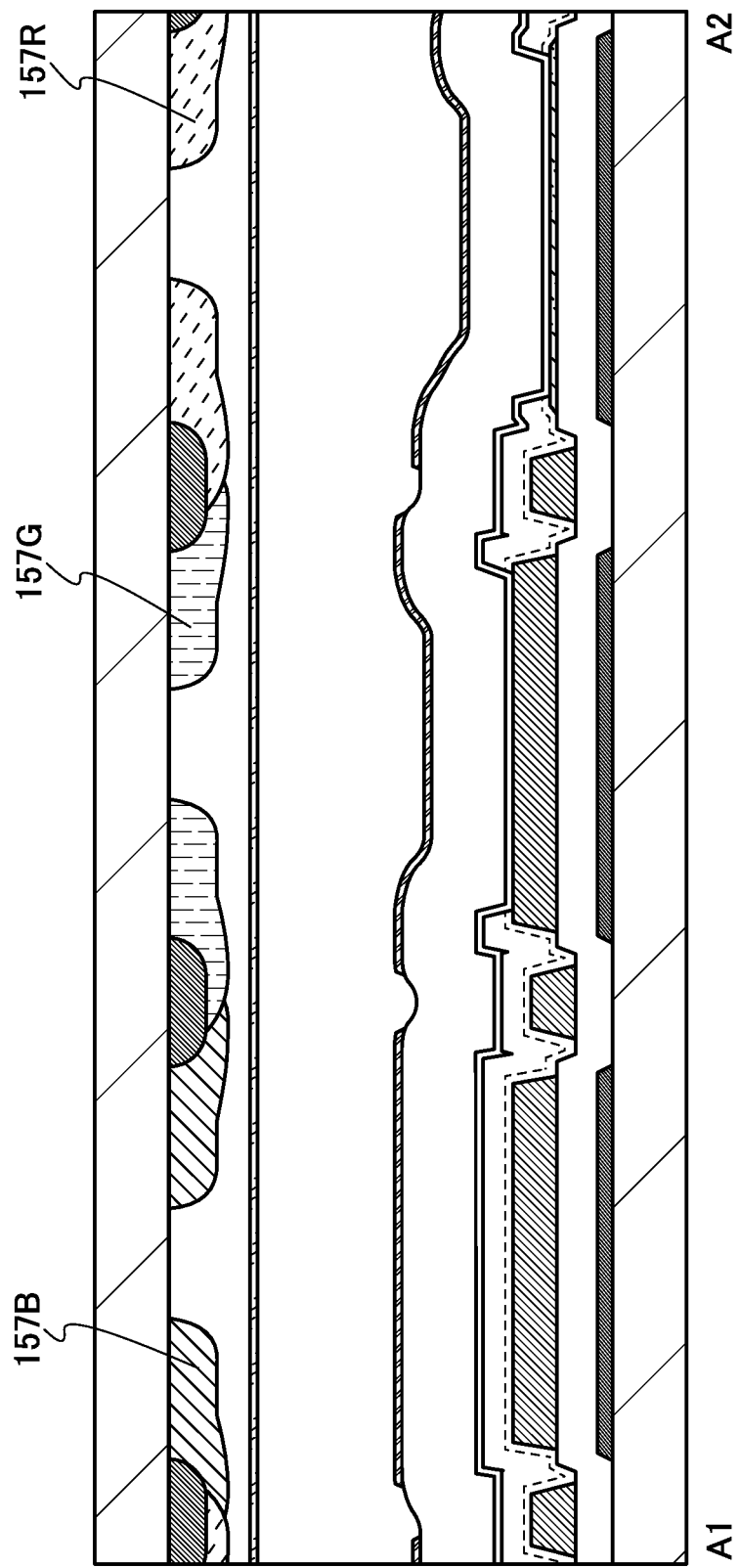
FIG. 20 is a cross-sectional view illustrating a pixel of a display device of one embodiment of the present invention.

As illustrated in FIG. 20, like a coloring layer 157B, a coloring layer 157G, and a coloring layer 157R, the coloring layers may have a structure resulting from partial removal from the coloring layers 156B, 156G, and 156R. Light enters the liquid crystal layer without passing through the coloring layers or reflected light exits without passing through the coloring layers, which enables bright display as a whole.

<Modification Example 4>

Figure 21:
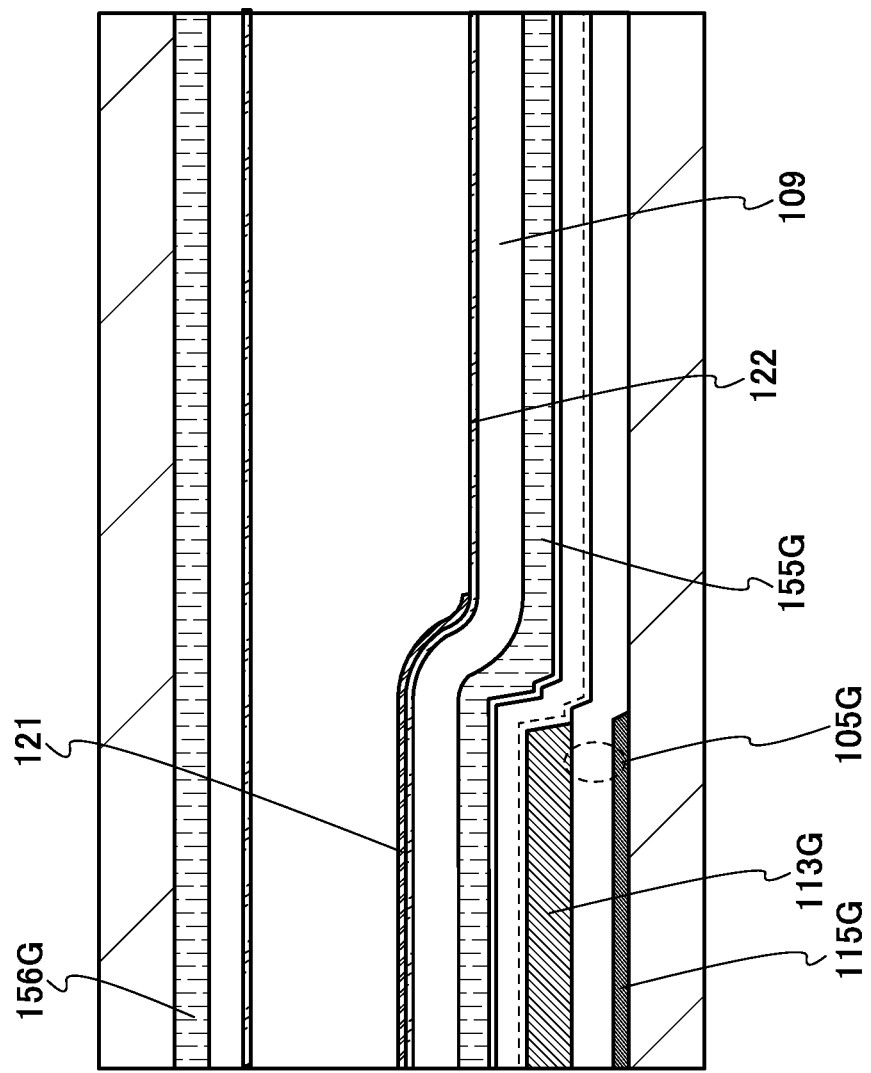
FIG. 21 is a cross-sectional view illustrating a pixel of a display device of one embodiment of the present invention.

In this specification, the reflective liquid crystal display device described above can be a transflective liquid crystal display device. FIG. 21 is used in the following description.

In the case of a transflective liquid crystal display device, a pixel electrode partly functions as the reflective electrode 121 and partly functions as a transmissive electrode 122. For example, the transmissive electrode 122 includes the same material as the conductive layer 160. Note that under the transmissive electrode, the capacitor 105G is preferably not placed. In the portion of the transmissive electrode, the capacitor 105G is not placed and the cell gap can be increased accordingly. The layers are adjusted so that the cell gap over the transmissive electrode 122 is approximately twice as long as that over the reflective electrode 121. Since the coloring layer 156G on the counter electrode side is designed such that two passages of light therethrough contributes to higher color reproducibility, the use of the coloring layer 156G in a transmissive display device leads to lower color reproducibility. For this reason, the coloring layer 155G is further placed under the transmissive electrode, thereby improving color reproducibility. Note that the coloring layer 155G may extend under the reflective electrode 121.

When the operation mode of the liquid crystal layer 164 is a vertical alignment (VA) mode, the liquid crystal display device usually performs normally-black operation. By applying voltage to pixels, display in the bright state is performed. According to the structure described in this embodiment, the luminance is adjusted to be the highest for each of RGB so that bright display can be performed. As compared with a conventional structure, almost a similar brightness level of display can be achieved even at lower applied voltage. Thus, power consumption can be reduced.

This embodiment can be combined with any of the other embodiments in this specification as appropriate.

(Embodiment 2)

In this embodiment, structures of transistors that can be used in a display device of one embodiment of the present invention are described with reference to FIGS. 15A to 15C and FIGS. 16A to 16C. The transistors described in this embodiment can each be used as the transistor in the pixel 101 described in Embodiment 1 or the transistor in a driver circuit portion 504 described in Embodiment 4. Note that portions that are similar to the portions in the above embodiment are denoted by the same reference numerals, and detailed description thereof is omitted.

Figure 15A:
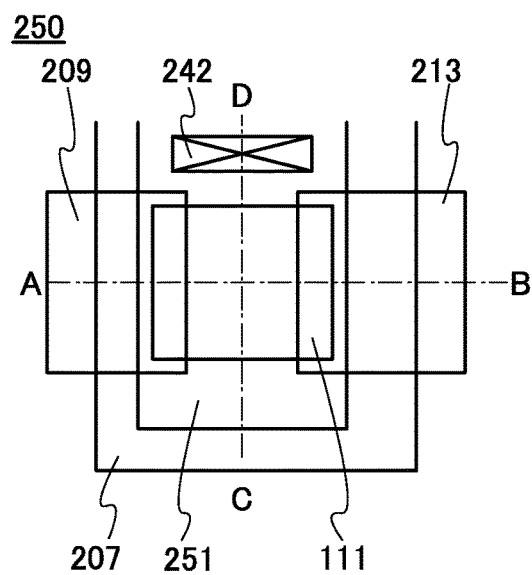
FIGS. 15A to 15C are a top view and cross-sectional views illustrating one mode of a transistor.
Figure 15B:
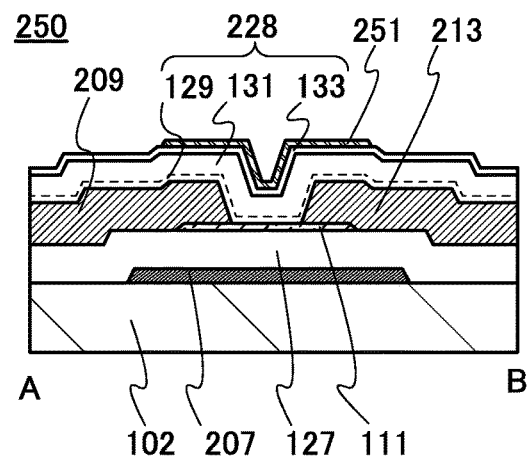
Figure 15C:
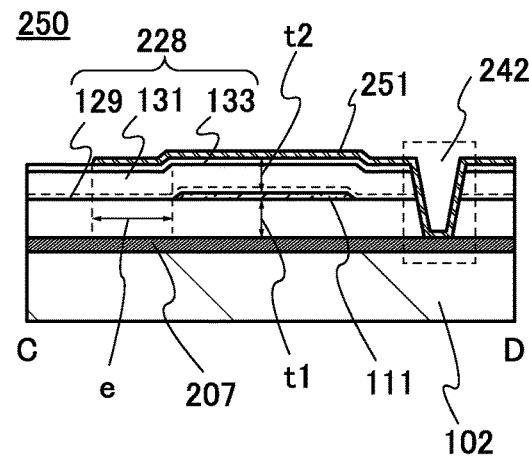

First, a transistor 250 illustrated in FIGS. 15A to 15C is described below.

FIGS. 15A to 15C are a top view and cross-sectional views of the transistor 250. FIG. 15A is a top view of the transistor 250, FIG. 15B is a cross-sectional view taken along the dash-dot line A-B in FIG. 15A, and FIG. 15C is a cross-sectional view taken along the dash-dot line C-D in FIG. 15A. Note that in FIG. 15A, the substrate 102, the insulating layers 127, 129, and 133 which function as gate insulating layers of the transistor 250, and the like are not illustrated for clarity.

The transistor 250 illustrated in FIGS. 15A to 15C is a channel-etched transistor and includes a gate electrode 207 provided over the substrate 102, the insulating layer 127 formed over the substrate 102 and the gate electrode 207, the semiconductor layer 111 overlapping with the gate electrode 207 with the insulating layer 127 provided therebetween, and a pair of electrodes 209 and 213 in contact with the semiconductor layer 111. Over the insulating layer 127, the semiconductor layer 111, and the pair of electrodes 209 and 213, the transistor 250 further includes a gate insulating layer 228 including the insulating layers 129, 131, and 133, and a gate electrode 251 formed over the gate insulating layer 228. The gate electrode 251 is connected to the gate electrode 207 through an opening 242 provided in the insulating layer 127 and the gate insulating layer 228. In order that an electric field of the gate electrode 251 be efficiently conducted to the semiconductor layer 111, the planarization film 134 described in Embodiment 1 is preferably not provided.

The gate electrode 251 is formed at the same time as the reflective electrode 121 described in Embodiment 1. A feature of the transistor 250 in this embodiment is that the gate electrode 251 functioning as a second gate electrode of the transistor 250 is formed in the same step as the reflective electrode 121 described in Embodiment 1.

The gate electrode 207 can be formed using a material and a formation method which are similar to those of the scan line 107 described in Embodiment 1. The opening 242 can be formed by a formation method similar to that of the openings 181 and 182 described in Embodiment 1. The pair of electrodes 209 and 213 can be formed using a material and a formation method which are similar to those of the data line 109 and the conductive layer 113 described in Embodiment 1.

In the transistor 250 described in this embodiment, the semiconductor layer 111 is provided between the gate electrodes 207 and 251. In the top view as illustrated in FIG. 15A, the gate electrode 251 overlaps with side surfaces of the semiconductor layer 111 with the gate insulating layer 228 provided therebetween.

The insulating layer 127 and the gate insulating layer 228 include the opening 242. As illustrated in FIG. 15C, outside a side surface on one side of the semiconductor layer 111, the gate electrode 251 is connected to the gate electrode 207 through the opening 242 provided in the insulating layer 127 and the gate insulating layer 228. The gate electrode 251 faces the side surface of the semiconductor layer 111 at a side surface of the opening 242. Outside a side surface on the other side of the semiconductor layer 111, the gate electrode 251 is not connected to the gate electrode 207. An end portion of the gate electrode 251 is positioned on an outer side of the side surface of the semiconductor layer 111.

Note that in the channel width direction as illustrated in FIG. 15C, a distance e from the side surface of the semiconductor layer 111 to a projected end portion of the gate electrode 251 on the interface between the insulating layer 127 and the gate insulating layer 228 is preferably 1 to 7.5 times the sum of a thickness t1 of the insulating layer 127 and a thickness t2 of the gate insulating layer 228. In the case where the distance e is greater than or equal to the sum of the thickness t1 of the insulating layer 127 and the thickness t2 of the gate insulating layer 228, an electric field of the gate electrode 251 affects the side surface of the semiconductor layer 111 or an end portion including the side surface and its vicinity of the semiconductor layer 111, which makes it possible to suppress generation of a parasitic channel at the side surface or the end portion of the semiconductor layer 111. In the case where the distance e is less than or equal to 7.5 times the sum of the thickness t1 of the insulating layer 127 and the thickness t2 of the gate insulating layer 228, the area of the transistor 250 can be decreased.

In the channel width direction of the transistor 250 illustrated in FIGS. 15A to 15C, outside the side surface on one side of the semiconductor layer 111, the gate electrode 207 and the gate electrode 251 are connected to each other, and outside the side surface on the other side of the semiconductor layer 111, the gate electrode 207 and the gate electrode 251 face each other with the insulating layer 127 and the gate insulating layer 228 provided therebetween. In the channel length direction, the opening 242 is formed wider than the distance between the electrodes 209 and 213, so that the electric field of the gate electrode 251 is efficiently conducted to the side surface and its vicinity of the semiconductor layer 111. In the channel width direction, the opening 242 may be formed on the outer side of each side surface of the semiconductor layer 111, so that the electric field of the gate electrode 251 can be more efficiently conducted.

Figure 16A:
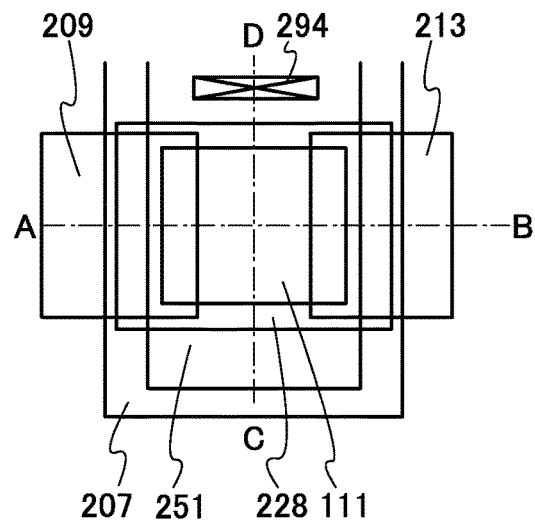
FIGS. 16A to 16C are a top view and cross-sectional views illustrating one mode of a transistor.
Figure 16B:
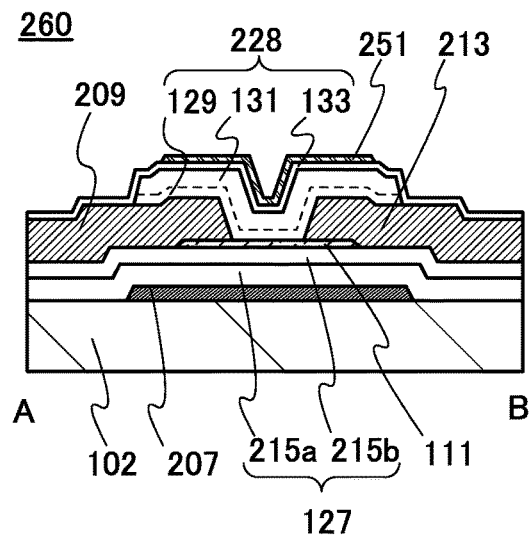
Figure 16C:
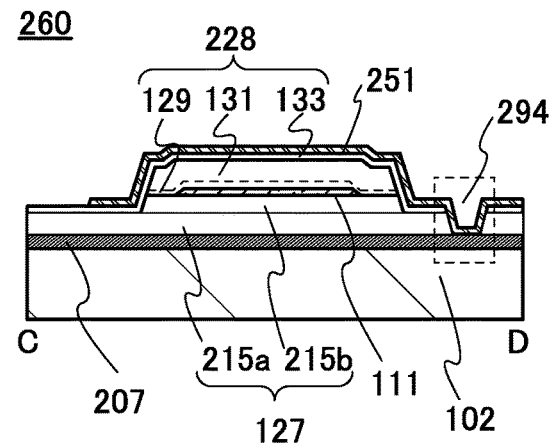

Next, a transistor 260 illustrated in FIGS. 16A to 16C is described below.

FIGS. 16A to 16C are a top view and cross-sectional views of the transistor 260. FIG. 16A is a top view of the transistor 260, FIG. 16B is a cross-sectional view taken along the dash-dot line A-B in FIG. 16A, and FIG. 16C is a cross-sectional view taken along the dash-dot line C-D in FIG. 16A. Note that in FIG. 16A, the substrate 102, the insulating layer 127 functioning as the gate insulating layer, and the like are not illustrated for clarity.

The transistor 260 illustrated in FIGS. 16A to 16C is a channel-etched transistor and includes the gate electrode 207 provided over the substrate 102, the insulating layer 127 formed over the substrate 102 and the gate electrode 207, the semiconductor layer 111 overlapping with the gate electrode 207 with the insulating layer 127 provided therebetween, and the pair of electrodes 209 and 213 in contact with the semiconductor layer 111. Over the insulating layer 127, the semiconductor layer 111, and the pair of electrodes 209 and 213, the transistor 260 further includes the gate insulating layer 228 including the insulating layers 129, 131, and 133 and the gate electrode 251 formed over the gate insulating layer 228. The gate electrode 251 is connected to the gate electrode 207 through the opening 294 provided in the insulating layers 127 and 133. In order that an electric field of the gate electrode 251 be efficiently conducted to the semiconductor layer 111, the planarization film 134 described in Embodiment 1 is preferably not provided.

The insulating layer 127 includes an insulating layer 215a and an insulating layer 215b. The insulating layer 215b is formed in a region overlapping with the semiconductor layer 111, the pair of electrodes 209 and 213, and the insulating layer 131.

The gate electrode 251 is formed at the same time as the reflective electrode 121 described in Embodiment 1. A feature of the transistor 260 in this embodiment is that the gate electrode 251 functioning as a second gate electrode of the transistor 260 is formed in the same step as the reflective electrode 121 described in Embodiment 1. The insulating layer 215a is formed using a silicon nitride film. The insulating layer 215b is formed using a silicon oxide film, a silicon oxynitride film, or the like. The insulating layers 215a and 215b can be formed using a formation method similar to that of the insulating layer 127.

The insulating layers 129 and 131 are separated from those in other transistors and overlap with the semiconductor layer 111. Specifically, in the channel length direction in FIG. 16B, the end portions of the insulating layers 129 and 131 are positioned over the pair of electrodes 209 and 213, and in the channel width direction in FIG. 16C, the end portions of the insulating layers 129 and 131 are positioned on the outer side of the semiconductor layer 111. The insulating layer 133 is formed so as to cover upper and side surfaces of the insulating layer 131 and the insulating layer 129 and is in contact with the insulating layer 215a. Note that the end portions of the insulating layers 129 and 131 may be positioned not over the pair of electrodes 209 and 213 but over the insulating layer 215b in the channel length direction.

In the channel width direction in FIG. 16C, the gate electrode 251 faces a side surface of the semiconductor layer 111 with side surfaces of the insulating layer 129 and the insulating layer 131 positioned therebetween.

In the channel width direction of the transistor 260 described in this embodiment, the semiconductor layer 111 is provided between the gate electrode 207 and the gate electrode 251 with the insulating layer 127 provided between the semiconductor layer 111 and the gate electrode 207 and with the gate insulating layer 228 provided between the semiconductor layer 111 and the gate electrode 251. In the top view as illustrated in FIG. 16A, the gate electrode 251 overlaps with the side surfaces of the semiconductor layer 111 with the gate insulating layer 228 provided therebetween.

As illustrated in FIG. 16C, outside the side surface on one side of the semiconductor layer 111, the gate electrode 251 is connected to the gate electrode 207 through the opening 294 provided in the insulating layers 127 and 133. The gate electrode 251 faces the side surfaces of the semiconductor layer 111 with the gate insulating layer 228 provided therebetween. Outside the side surface on the other side of the semiconductor layer 111, the gate electrode 251 is not connected to the gate electrode 207. End portions of the gate electrode 251 are located on the outer sides of the side surfaces of the semiconductor layer 111

Although the gate electrode 207 and the gate electrode 251 are connected to each other only outside the side surface on one side of the semiconductor layer 111 in the channel width direction of the transistor 260 as illustrated in FIG. 16C, the gate electrode 207 and the gate electrode 251 may be connected to each other outside the side surfaces on both sides of the semiconductor layer 111.

In the transistor 260 described in this embodiment, the insulating layer 215a and the insulating layer 133 are in contact with each other while surrounding the semiconductor layer 111 and the insulating layer 131. The insulating layer 215a and the insulating layer 133 in which the diffusion coefficient of oxygen is low have a barrier property against oxygen. Thus, part of oxygen contained in the insulating layer 131 can be efficiently moved to the semiconductor layer 111, whereby the number of oxygen vacancies in the semiconductor layer 111 can be reduced. The insulating layer 215a and the insulating layer 133 in which the diffusion coefficient of water, hydrogen, or the like is low have a barrier property against water, hydrogen, or the like. Thus, it is possible to prevent water, hydrogen, or the like from diffusing into the semiconductor layer 111 from the outside. Accordingly, the transistor 260 has high reliability.

Note that the steps for forming the transistor 260 are as follows.

First, a step similar to the step illustrated in FIGS. 7A to 7C in Embodiment 1 is performed. Next, the insulating layers 129 and 131 having an island shape are formed by separation at the same time as the openings 117 and 118. Then, the insulating layer 133 is formed. After that, the insulating layers 133 and 127 are processed; thus, the opening 294 reaching the gate electrode 207 is formed. After that, a conductive layer is formed over the insulating layer 133 and is processed; thus, the gate electrode 251 is formed.

The structure described in this embodiment can be used in appropriate combination with the structure described in any of the other embodiments. Note that the transistor described in Embodiment 1 can be employed in the pixel portion and the structure described in this embodiment can be employed for a transistor used for the driver circuit portion 504 described in Embodiment 4. Alternatively, the structure described in this embodiment can be employed in the pixel portion and the transistor described in Embodiment 1 can be employed for the driver circuit portion 504 described in Embodiment 4.

(Embodiment 3)

In this embodiment, an example of an oxide semiconductor film that can be used for the semiconductor layer in the transistor and the capacitor of the display device described in Embodiments 1 and 2 is described.

<Crystallinity of Oxide Semiconductor Film>

A structure of an oxide semiconductor film is described below.

An oxide semiconductor film is classified roughly into a non-single-crystal oxide semiconductor film and a single crystal oxide semiconductor film. The non-single-crystal oxide semiconductor film includes any of a c-axis aligned crystalline oxide semiconductor (CAAC-OS) film, a polycrystalline oxide semiconductor film, a microcrystalline oxide semiconductor film, an amorphous oxide semiconductor film, and the like.

First, a CAAC-OS film is described.

The CAAC-OS film is one of oxide semiconductor films having a plurality of c-axis aligned crystal parts.

With a transmission electron microscope (TEM), a combined analysis image (also referred to as a high-resolution TEM image) of a bright-field image and a diffraction pattern of the CAAC-OS film is observed. Consequently, a plurality of crystal parts can be observed clearly. However, in the high-resolution TEM image, a boundary between crystal parts, i.e., a grain boundary is not observed clearly. Thus, in the CAAC-OS film, a reduction in electron mobility due to the grain boundary is less likely to occur.

According to the high-resolution cross-sectional TEM image of the CAAC-OS film observed in a direction substantially parallel to a sample surface, metal atoms are arranged in a layered manner in the crystal parts. Each metal atom layer has a shape reflecting a surface over which the CAAC-OS film is formed (hereinafter, a surface over which the CAAC-OS film is formed is referred to as a formation surface) or a top surface of the CAAC-OS film, and is arranged parallel to the formation surface or the top surface of the CAAC-OS film.

According to the high-resolution plan-view TEM image of the CAAC-OS film observed in a direction substantially perpendicular to the sample surface, metal atoms are arranged in a triangular or hexagonal configuration in the crystal parts. However, there is no regularity of arrangement of metal atoms between different crystal parts.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle (2θ) is around 31°. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

Note that when the CAAC-OS film with an $InGaZnO_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ do not appear at around 36°.

The CAAC-OS film is an oxide semiconductor film with a low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Furthermore, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has a negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Charge trapped by the carrier traps in the oxide semiconductor film takes a long time to be released, and might behave like fixed charge. Thus, the transistor that includes the oxide semiconductor film having high impurity concentration and a high density of defect states has unstable electrical characteristics in some cases.

With use of the CAAC-OS film in a transistor, a variation in the electrical characteristics of the transistor due to irradiation with visible light or ultraviolet light is small.

Next, a microcrystalline oxide semiconductor film is described.

A microcrystalline oxide semiconductor film has a region in which a crystal part is observed and a region in which a crystal part is not observed clearly in a high-resolution TEM image. In most cases, a crystal part in the microcrystalline oxide semiconductor film is greater than or equal to 1 nm and less than or equal to 100 nm, or greater than or equal to 1 nm and less than or equal to 10 nm. A microcrystal with a size greater than or equal to 1 nm and less than or equal to 10 nm, or a size greater than or equal to 1 nm and less than or equal to 3 nm is specifically referred to as nanocrystal (nc). An oxide semiconductor film including nanocrystal is referred to as a nanocrystalline oxide semiconductor (nc- OS) film. In a high resolution TEM image of the nc-OS film, a grain boundary cannot be found clearly in the nc-OS film in some cases.

In the nc-OS film, a microscopic region (for example, a region with a size greater than or equal to 1 nm and less than or equal to 10 nm, in particular, a region with a size greater than or equal to 1 nm and less than or equal to 3 nm) has a periodic atomic order. There is no regularity of crystal orientation between different crystal parts in the nc-OS film. Thus, the orientation of the whole film is not observed. Accordingly, in some cases, the nc-OS film cannot be distinguished from an amorphous oxide semiconductor film depending on an analysis method. For example, when the nc-OS film is subjected to structural analysis by an out-of-plane method with an XRD apparatus using an X-ray having a diameter larger than the size of a crystal part, a peak which shows a crystal plane does not appear. Furthermore, a halo pattern is shown in an electron diffraction pattern (also referred to as a selected-area electron diffraction pattern) of the nc-OS film obtained by using an electron beam having a probe diameter larger than the diameter of a crystal part (e.g., larger than or equal to 50 nm). Meanwhile, spots are shown in a nanobeam electron diffraction pattern of the nc-OS film obtained by using an electron beam having a probe diameter close to, or smaller than the diameter of a crystal part. Furthermore, in a nanobeam electron diffraction pattern of the nc-OS film, for example, bright regions in a circular (or ring-shaped) pattern are shown in some cases. Also in a nanobeam electron diffraction pattern of the nc-OS film, a plurality of spots are shown in a ring-like region in some cases.

The nc-OS film is an oxide semiconductor film that has high regularity as compared to an amorphous oxide semiconductor film. Therefore, the nc-OS film has a lower density of defect states than an amorphous oxide semiconductor film. Note that there is no regularity of crystal orientation between different crystal parts in the nc-OS film. Therefore, the nc-OS film has a higher density of defect states than the CAAC-OS film.

Next, an amorphous oxide semiconductor film is described.

The amorphous oxide semiconductor film has disordered atomic arrangement and no crystal part. For example, the amorphous oxide semiconductor film does not have a specific state as in quartz.

In a high-resolution TEM image of the amorphous oxide semiconductor film, crystal parts cannot be found.

When the amorphous oxide semiconductor film is subjected to structural analysis by an out-of-plane method with an XRD apparatus, a peak which shows a crystal plane does not appear. A halo pattern is shown in an electron diffraction pattern of the amorphous oxide semiconductor film. Furthermore, a halo pattern is shown but a spot is not shown in a nanobeam electron diffraction pattern of the amorphous oxide semiconductor film.

Note that an oxide semiconductor film may have a structure having physical properties between the nc-OS film and the amorphous oxide semiconductor film. The oxide semiconductor film having such a structure is specifically referred to as an amorphous-like oxide semiconductor (amorphous-like OS) film.

In a high-resolution TEM image of the amorphous-like OS film, a void can be observed. Furthermore, in the high-resolution TEM image, there are a region where a crystal part is clearly observed and a region where a crystal part is not observed. In the amorphous-like OS film, crystallization by a slight amount of electron beam used for TEM observation occurs and growth of the crystal part is found sometimes. In contrast, crystallization by a slight amount of electron beam used for TEM observation is scarcely observed in the nc-OS film having good quality.

Note that the crystal part size in the amorphous-like OS film and the nc-OS film can be measured using high-resolution TEM images. For example, an $InGaZnO_4$ crystal has a layered structure in which two Ga—Zn—O layers are included between In—O layers. A unit cell of the $InGaZnO_4$ crystal has a structure in which nine layers of three In—O layers and six Ga—Zn—O layers are layered in the c-axis direction. Accordingly, the spacing between these adjacent layers is equivalent to the lattice spacing on the (009) plane (also referred to as d value). The value is calculated to 0.29 nm from crystal structure analysis. Thus, each of the lattice fringes in which the spacing therebetween is from 0.28 nm to 0.30 nm corresponds to the a-b plane of the $InGaZnO_4$ crystal, focusing on the lattice fringes in the high-resolution TEM image.

Note that an oxide semiconductor film may be a stacked film including two or more kinds of an amorphous oxide semiconductor film, an amorphous-like OS film, a microcrystalline oxide semiconductor film, and a CAAC-OS film, for example.

The structure described in this embodiment can be used in appropriate combination with any of the structures described in the other embodiments.

(Embodiment 4)

In this embodiment, a display device of one embodiment of the present invention will be described with reference to FIGS. 17A and 17B.

The display device illustrated in FIG. 17A includes a region including display elements in pixels (hereinafter, the region is referred to as pixel portion 502), a circuit portion being provided outside the pixel portion 502 and including a circuit for driving the pixels (hereinafter, the portion is referred to as driver circuit portion 504), circuits each having a function of protecting an element (hereinafter, the circuits are referred to as protection circuits 506), and a terminal portion 507. Note that the protection circuits 506 are not necessarily provided.

A part or the whole of the driver circuit portion 504 is preferably formed over a substrate over which the pixel portion 502 is formed, in which case the number of components and the number of terminals can be reduced. When a part or the whole of the driver circuit portion 504 is not formed over the substrate over which the pixel portion 502 is formed, the part or the whole of the driver circuit portion 504 can be mounted by COG or tape automated bonding (TAB).

The pixel portion 502 includes a plurality of circuits for driving display elements arranged in X rows (X is a natural number of 2 or more) and Y columns (Y is a natural number of 2 or more) (hereinafter, such circuits are referred to as pixel circuits 501). The driver circuit portion 504 includes driver circuits such as a circuit for supplying a signal (scan signal) to select a pixel (hereinafter, the circuit is referred to as a gate driver 504a) and a circuit for supplying a signal (data signal) to drive a display element in a pixel (hereinafter, the circuit is referred to as source driver 504b).

The gate driver 504a includes a shift register or the like. The gate driver 504a receives a signal for driving the shift register through the terminal portion 507 and outputs a signal. For example, the gate driver 504a receives a start pulse signal, a clock signal, or the like and outputs a pulse signal. The gate driver 504a has a function of controlling the potentials of wirings supplied with scan signals (hereinafter, such wirings are referred to as scan lines GL_1 to GL_X). Note that a plurality of gate drivers 504*a* may be provided to control the scan lines GL_1 to GL_X separately. Alternatively, the gate driver 504*a* has a function of supplying an initialization signal. Without being limited thereto, the gate driver 504*a* can supply another signal.

The source driver 504*b* includes a shift register or the like. The source driver 504*b* receives a signal (video signal) from which a data signal is derived, as well as a signal for driving the shift register, through the terminal portion 507. The source driver 504*b* has a function of generating a data signal to be written to the pixel circuits 501 which is based on the video signal. In addition, the source driver 504*b* has a function of controlling output of a data signal in response to a pulse signal produced by input of a start pulse signal, a clock signal, or the like. Furthermore, the source driver 504*b* has a function of controlling the potentials of wirings supplied with data signals (hereinafter, such wirings are referred to as data lines DL_1 to DL_Y). Alternatively, the source driver 504*b* has a function of supplying an initialization signal. Without being limited thereto, the source driver 504*b* can supply another signal.

The source driver 504*b* includes a plurality of analog switches or the like, for example. The source driver 504*b* can output, as the data signals, signals obtained by time-dividing the video signal by sequentially turning on the plurality of analog switches. The source driver 504*b* may include a shift register or the like.

A pulse signal and a data signal are input to each of the plurality of pixel circuits 501 through one of the plurality of scan lines GL supplied with scan signals and one of the plurality of data lines DL supplied with data signals, respectively. Writing and holding of the data signal to and in each of the plurality of pixel circuits 501 are controlled by the gate driver 504*a*. For example, to the pixel circuit 501 in the m-th row and the n-th column (m is a natural number less than or equal to X, and n is a natural number less than or equal to Y), a pulse signal is input from the gate driver 504*a* through the scan line GL_m, and a data signal is input from the source driver 504*b* through the data line DL_n in accordance with the potential of the scan line GL_m.

Figure 17A:
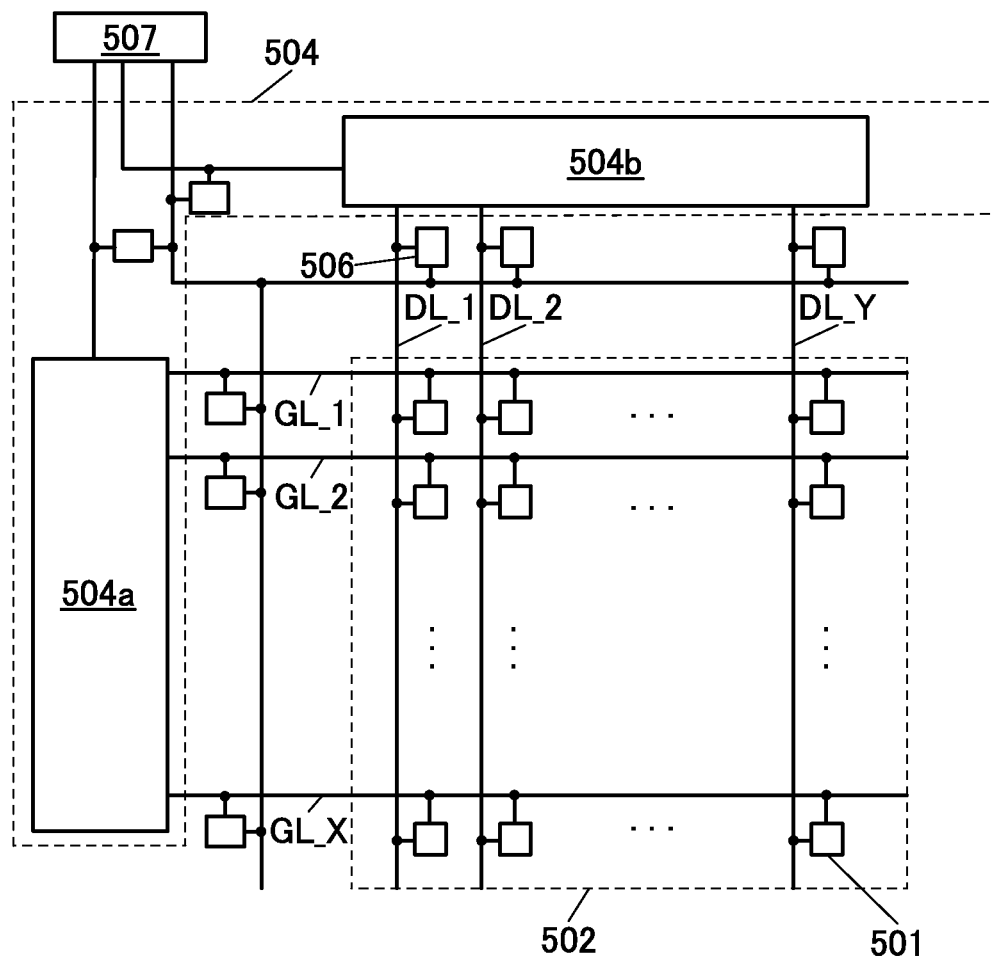
FIGS. 17A and 17B are a block diagram and a circuit diagram illustrating a display device.

The protection circuit 506 shown in FIG. 17A is connected to, for example, the scan line GL between the gate driver 504*a* and the pixel circuit 501. Alternatively, the protection circuit 506 is connected to the data line DL between the source driver 504*b* and the pixel circuit 501. Alternatively, the protection circuit 506 can be connected to a wiring between the gate driver 504*a* and the terminal portion 507. Alternatively, the protection circuit 506 can be connected to a wiring between the source driver 504*b* and the terminal portion 507. Note that the terminal portion 507 means a portion having terminals for inputting power, control signals, and video signals to the display device from external circuits.

The protection circuit 506 is a circuit that electrically connects a wiring connected to the protection circuit to another wiring when a potential out of a certain range is applied to the wiring connected to the protection circuit.

As illustrated in FIG. 17A, the protection circuits 506 are provided for the pixel portion 502 and the driver circuit portion 504, so that the resistance of the display device to overcurrent generated by electrostatic discharge (ESD) or the like can be improved. Note that the configuration of the protection circuits 506 is not limited to that, and for example, a configuration in which the protection circuits 506 are connected to the gate driver 504*a* or a configuration in which the protection circuits 506 are connected to the source driver 504*b* may be employed. Alternatively, the protection circuits 506 may be configured to be connected to the terminal portion 507.

In FIG. 17A, an example in which the driver circuit portion 504 includes the gate driver 504*a* and the source driver 504*b* is shown; however, the structure is not limited thereto. For example, only the gate driver 504*a* may be formed and a separately prepared substrate where a source driver circuit is formed (e.g., a driver circuit substrate formed with a single crystal semiconductor film or a polycrystalline semiconductor film) may be mounted.

Figure 17B:
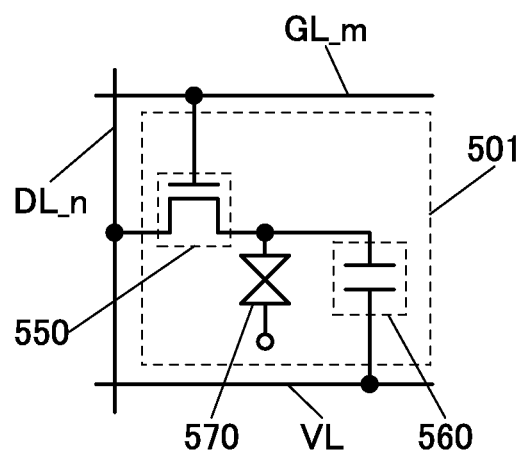

Each of the plurality of pixel circuits 501 in FIG. 17A can have a structure illustrated in FIG. 17B, for example.

The pixel circuit 501 illustrated in FIG. 17B includes the liquid crystal element 570, the transistor 550, and the capacitor 560. As the transistor 550, any of the transistors described in the above embodiments can be used.

The potential of one of a pair of electrodes of the liquid crystal element 570 is set in accordance with the specifications of the pixel circuit 501 as appropriate. The alignment state of the liquid crystal element 570 depends on written data. A common potential may be supplied to one of the pair of electrodes of the liquid crystal element 570 included in each of the plurality of pixel circuits 501. Furthermore, the potential supplied to one of the pair of electrodes of the liquid crystal element 570 in the pixel circuit 501 in one row may be different from the potential supplied to one of the pair of electrodes of the liquid crystal element 570 in the pixel circuit 501 in another row.

In the pixel circuit 501 in the m-th row and the n-th column, one of a source electrode and a drain electrode of the transistor 550 is electrically connected to the data line DL_n, and the other is electrically connected to the other of the pair of electrodes of the liquid crystal element 570. A gate electrode of the transistor 550 is electrically connected to the scan line GL_m. The transistor 550 has a function of controlling whether to write a data signal by being turned on or off.

One of a pair of electrodes of the capacitor 560 is electrically connected to a wiring to which a potential is supplied (hereinafter referred to as potential supply line VL), and the other is electrically connected to the other of the pair of electrodes of the liquid crystal element 570. The potential of the potential supply line VL is set in accordance with the specifications of the pixel circuit 501 as appropriate. The capacitor 560 functions as a storage capacitor for storing written data.

For example, in the display device including the pixel circuit 501 in FIG. 17B, the pixel circuits 501 are sequentially selected row by row by the gate driver 504*a* shown in FIG. 17A, whereby the transistors 550 are turned on and a data signal is written.

When the transistors 550 are turned off, the pixel circuits 501 in which the data has been written are brought into a holding state. This operation is sequentially performed row by row; thus, an image can be displayed.

The structure described in this embodiment can be used as appropriate in combination with any of the structures described in the other embodiments.

(Embodiment 5)

In this embodiment, a display module and electronic devices that can be formed using a display device of one embodiment of the present invention are described with reference to FIG. 18 and FIGS. 19A to 19G.

Figure 18:
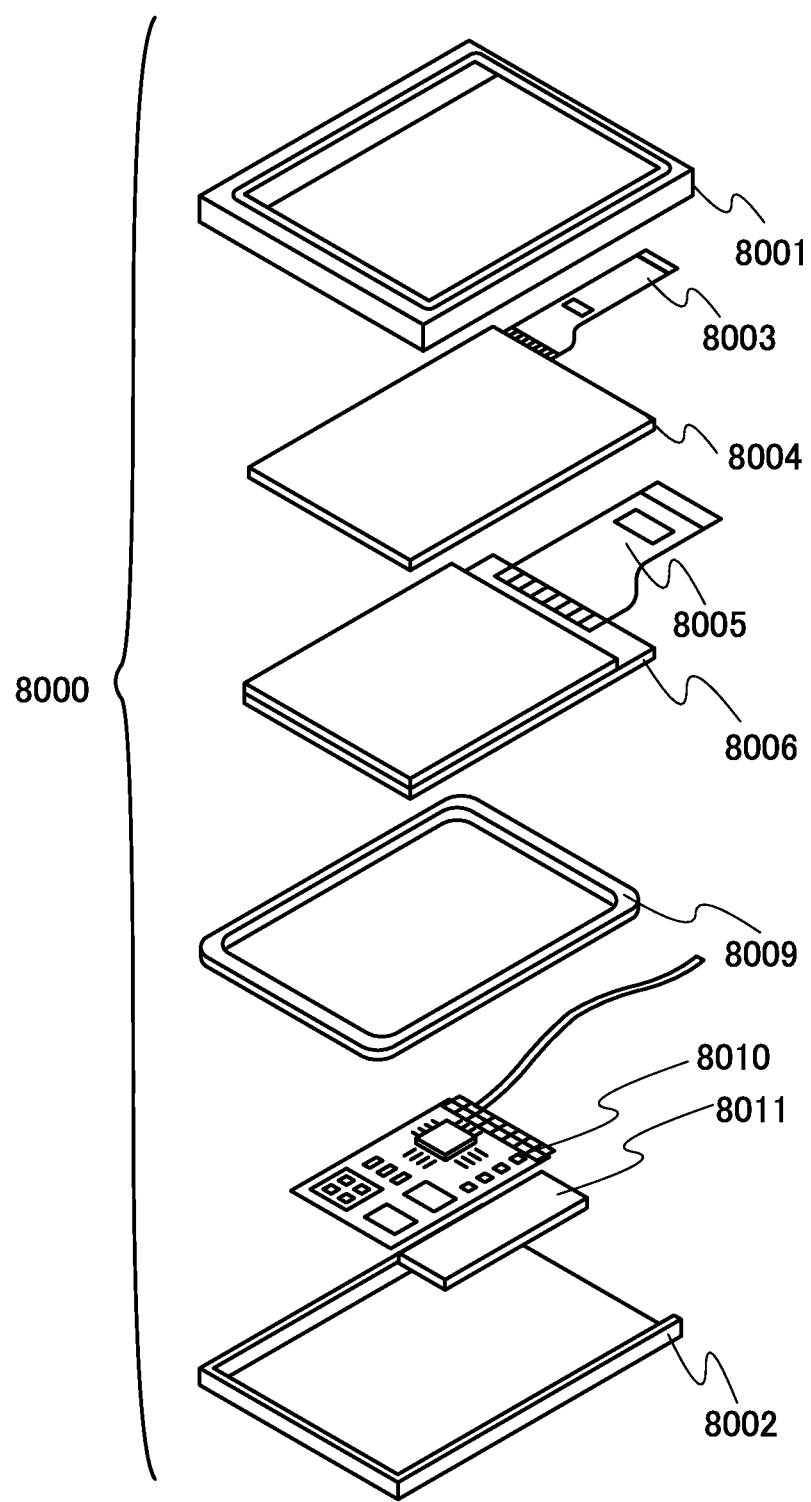
FIG. 18 illustrates a display module.

In a display module 8000 illustrated in FIG. 18, a touch panel 8004 connected to an FPC 8003, a display panel 8006 connected to an FPC 8005, a frame 8009, a printed board 8010, and a battery 8011 are provided between an upper cover 8001 and a lower cover 8002.

The display device of one embodiment of the present invention can be used for, for example, the display panel 8006.

The shapes and sizes of the upper cover 8001 and the lower cover 8002 can be changed as appropriate in accordance with the sizes of the touch panel 8004 and the display panel 8006.

The touch panel 8004 can be a resistive touch panel or a capacitive touch panel and can be formed to overlap with the display panel 8006. A counter substrate (sealing substrate) of the display panel 8006 can have a touch panel function. A photosensor may be provided in each pixel of the display panel 8006 to form an optical touch panel.

The frame 8009 protects the display panel 8006 and also functions as an electromagnetic shield for blocking electromagnetic waves generated by the operation of the printed board 8010. The frame 8009 may function as a radiator plate.

The printed board 8010 is provided with a power supply circuit and a signal processing circuit for outputting a video signal and a clock signal. As a power source for supplying power to the power supply circuit, an external commercial power source or a power source using the battery 8011 provided separately may be used. The battery 8011 can be omitted in the case of using a commercial power source.

The display module 8000 may be additionally provided with a member such as a polarizing plate, a retardation plate, or a prism sheet.

FIGS. 19A to 19G illustrate electronic devices. These electronic devices can include a housing 5000, a display portion 5001, a speaker 5003, an LED lamp 5004, operation keys 5005 (including a power switch or an operation switch), a connection terminal 5006, a sensor 5007 (a sensor having a function of measuring or sensing force, displacement, position, speed, acceleration, angular velocity, optical rotation al frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 19A:
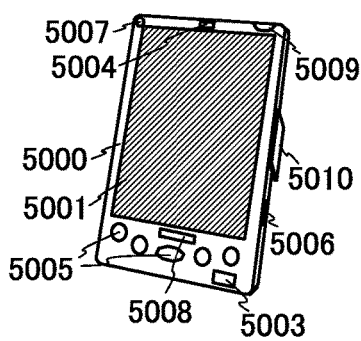
FIGS. 19A to 19G illustrate electronic devices.
Figure 19B:
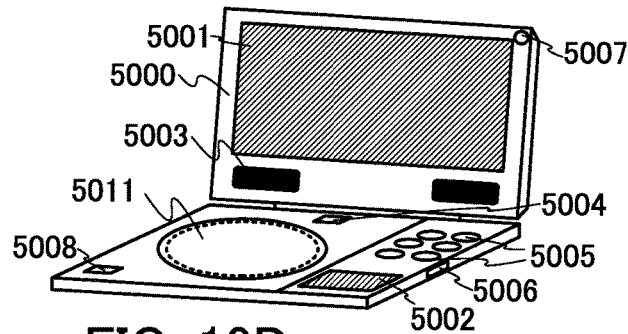
Figure 19C:
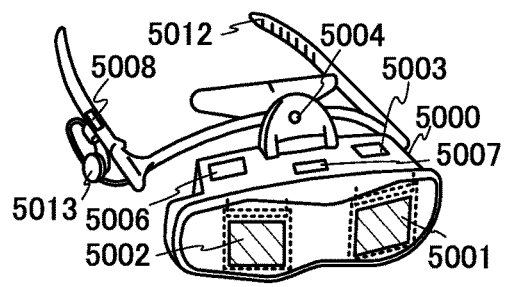
Figure 19D:
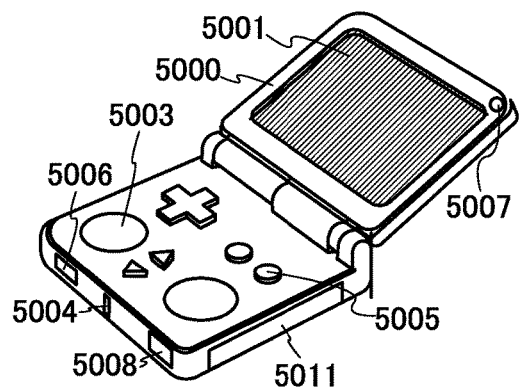
Figure 19E:
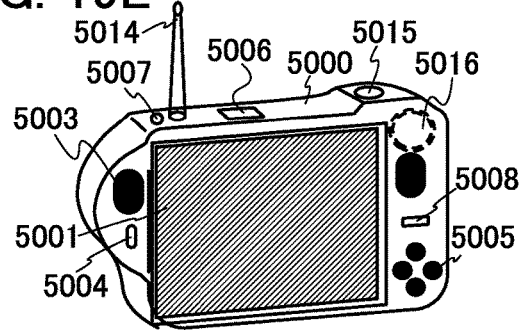
Figure 19F:
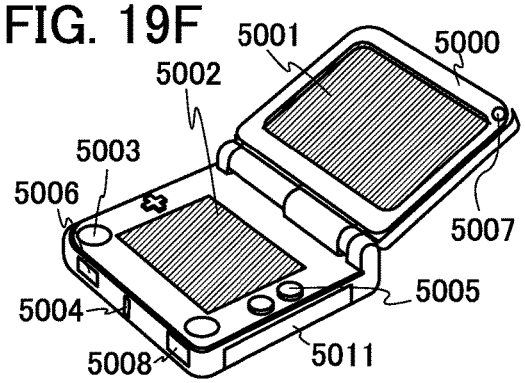
Figure 19G:
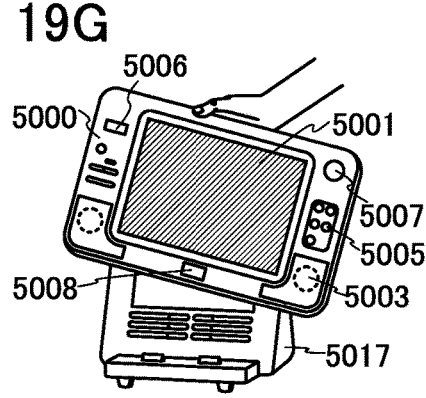

FIG. 19A illustrates a mobile computer that can include a switch 5009, an infrared port 5010, and the like in addition to the above components. FIG. 19B illustrates a portable image reproducing device (e.g., a DVD player) that is provided with a memory medium and can include a second display portion 5002, a memory medium reading portion 5011, and the like in addition to the above components. FIG. 19C illustrates a goggle-type display that can include the second display portion 5002, a support 5012, an earphone 5013, and the like in addition to the above components. FIG. 19D illustrates a portable game machine that can include the memory medium reading portion 5011 and the like in addition to the above components. FIG. 19E illustrates a digital camera that has a television reception function and can include an antenna 5014, a shutter button 5015, an image receiving portion 5016, and the like in addition to the above components. FIG. 19F illustrates a portable game machine that can include the second display portion 5002, the memory medium reading portion 5011, and the like in addition to the above components. FIG. 19G illustrates a portable television receiver that can include a charger 5017 capable of transmitting and receiving signals, and the like in addition to the above components.

The electronic devices illustrated in FIGS. 19A to 19G can have a variety of functions, for example, a function of displaying a variety of data (a still image, a moving image, a text image, and the like) on the display portion, a touch panel function, a function of displaying a calendar, date, time, and the like, a function of controlling a process with a variety of software (programs), a wireless communication function, a function of being connected to a variety of computer networks with a wireless communication function, a function of transmitting and receiving a variety of data with a wireless communication function, a function of reading a program or data stored in a memory medium and displaying the program or data on the display portion, and the like. Furthermore, the electronic device including a plurality of display portions can have a function of displaying image data mainly on one display portion while displaying text data on another display portion, a function of displaying a three-dimensional image by displaying images on a plurality of display portions with a parallax taken into account, or the like. Furthermore, the electronic device including an image receiving portion can have a function of shooting a still image, a function of taking a moving image, a function of automatically or manually correcting a shot image, a function of storing a shot image in a memory medium (an external memory medium or a memory medium incorporated in the camera), a function of displaying a shot image on the display portion, or the like. Note that functions that can be provided for the electronic devices illustrated in FIGS. 19A to 19G are not limited to those described above, and the electronic devices can have a variety of functions.

The electronic devices described in this embodiment each include the display portion for displaying some sort of data.

The structure described in this embodiment can be used as appropriate in combination with any of the structures described in the other embodiments.

This application is based on Japanese Patent Application serial no. 2014-109844 filed with the Japan Patent Office on May 28, 2014, the entire contents of which are hereby incorporated by reference.

What is claimed is:

1. A reflective liquid crystal display device comprising:
a first pixel comprising a first cell gap; and
a second pixel comprising a second cell gap,
wherein the first pixel comprises:
a first conductive layer over a first substrate;
a first insulating layer over the first conductive layer;
a second insulating layer over the first insulating layer; and
a first reflective electrode over the second insulating layer,
wherein the second pixel comprises:
a second conductive layer over the first substrate;
the first insulating layer over the second conductive layer;
the second insulating layer over the first insulating layer;
a second reflective electrode over the second insulating layer; and
a first opening in the second insulating layer overlapping with the second reflective electrode, and
wherein the second reflective electrode is not provided in the first opening, and
wherein the first cell gap is shorter than the second cell gap.

2. The reflective liquid crystal display device according to claim 1,
wherein the first insulating layer comprises silicon oxide, and wherein the second insulating layer comprises silicon nitride.

3. An electronic device comprising the reflective liquid crystal display device according to claim 1.

4. A reflective liquid crystal display device comprising:
a first pixel comprising a first cell gap;
a second pixel comprising a second cell gap; and
a third pixel comprising a third cell gap,
wherein the first pixel comprises:
   a first conductive layer over a first substrate;
   a first insulating layer over the first conductive layer;
   a second conductive layer over the first insulating layer;
   a second insulating layer over the second conductive layer;
   a third insulating layer over the second insulating layer; and
   a first reflective electrode over the third insulating layer,
wherein the second pixel comprises:
   a third conductive layer over the first substrate;
   the first insulating layer over the third conductive layer;
   a fourth conductive layer over the first insulating layer;
   the second insulating layer over the fourth conductive layer;
   the third insulating layer over the second insulating layer;
   a second reflective electrode over the third insulating layer; and
   a first opening in the second insulating layer overlapping with the second reflective electrode,
wherein the third pixel comprises:
   a fifth conductive layer over the first substrate;
   the first insulating layer over the fifth conductive layer;
   a metal oxide layer over the first insulating layer;
   the second insulating layer over the metal oxide layer;
   the third insulating layer over the second insulating layer;
   a third reflective electrode over the third insulating layer, and
   a second opening in the second insulating layer overlapping with the third reflective electrode, and
wherein the second reflective electrode is not provided in the first opening,
wherein the third reflective electrode is not provided in the second opening, and
wherein the metal oxide layer is in contact with the third insulating layer.

5. The reflective liquid crystal display device according to claim 4,
wherein the second insulating layer comprises silicon oxide, and
wherein the third insulating layer comprises silicon nitride.

6. The reflective liquid crystal display device according to claim 4,
wherein the metal oxide layer comprises an oxide represented by an In-M-Zn oxide containing at least indium (In), zinc (Zn), and M, and
wherein M represents an element selected from Al, Ga, Ge, Y, Zr, Sn, La, Ce, and Hf.

7. An electronic device comprising the reflective liquid crystal display device according to claim 4.

8. A reflective liquid crystal display device comprising:
a first pixel comprising a first cell gap;
a second pixel comprising a second cell gap; and
a third pixel comprising a third cell gap,
wherein the first pixel comprises:
   a first conductive layer over a first substrate;
   a first insulating layer over the first conductive layer;
   a second conductive layer over the first insulating layer;
   a second insulating layer over the second conductive layer;
   a third insulating layer over the second insulating layer; and
   a first reflective electrode over the third insulating layer,
wherein the second pixel comprises:
   a third conductive layer over the first substrate;
   the first insulating layer over the third conductive layer;
   a fourth conductive layer over the first insulating layer;
   the second insulating layer over the fourth conductive layer;
   the third insulating layer over the second insulating layer;
   a second reflective electrode over the third insulating layer; and
   a first opening in the second insulating layer overlapping with the second reflective electrode,
wherein the third pixel comprises:
   a fifth conductive layer over the first substrate;
   the first insulating layer over the fifth conductive layer;
   a metal oxide layer over the first insulating layer;
   the second insulating layer over the metal oxide layer;
   the third insulating layer over the second insulating layer;
   a third reflective electrode over the third insulating layer, and
   a second opening in the second insulating layer overlapping with the third reflective electrode,
wherein the second reflective electrode is not provided in the first opening,
wherein the third reflective electrode is not provided in the second opening,
wherein the metal oxide layer is in contact with the third insulating layer,
wherein the first cell gap is shorter than the second cell gap,
wherein the second cell gap is shorter than the third cell gap,
wherein the metal oxide layer is thinner than the second conductive layer and the fourth conductive layer,
wherein the first conductive layer, the third conductive layer, and the fifth conductive layer are formed from the same layer, and
wherein the second conductive layer and the fourth conductive layer are formed from the same layer.

9. The reflective liquid crystal display device according to claim 8,
wherein the second insulating layer comprises silicon oxide, and
wherein the third insulating layer comprises silicon nitride.

10. The reflective liquid crystal display device according to claim 8,
wherein the metal oxide layer comprises an oxide represented by an In-M-Zn oxide containing at least indium (In), zinc (Zn), and M, and
wherein M represents an element selected from Al, Ga, Ge, Y, Zr, Sn, La, Ce, and Hf.

11. An electronic device comprising the reflective liquid crystal display device according to claim 8.

* * * * *